(12) United States Patent
Rieger, III

(10) Patent No.: US 7,136,915 B2
(45) Date of Patent: *Nov. 14, 2006

(54) SYSTEM FOR COMMUNICATING THROUGH MAPS

(76) Inventor: Charles J Rieger, III, 7417 River Falls Dr., Potomac, MD (US) 20854

( * ) Notice: Subject to any disclaimer, the term of this patent is extended or adjusted under 35 U.S.C. 154(b) by 834 days.

This patent is subject to a terminal disclaimer.

(21) Appl. No.: 10/025,880

(22) Filed: Dec. 26, 2001

(65) Prior Publication Data
US 2002/0103892 A1 Aug. 1, 2002

Related U.S. Application Data

(63) Continuation-in-part of application No. 09/524,888, filed on Mar. 14, 2000.

(51) Int. Cl.
G06F 15/173 (2006.01)
G06F 12/16 (2006.01)

(52) U.S. Cl. .................... 709/223; 709/206; 705/25; 370/316

(58) Field of Classification Search ............... 709/223, 709/209; 705/27; 370/316
See application file for complete search history.

(56) References Cited

U.S. PATENT DOCUMENTS

| | | | | |
|---|---|---|---|---|
| 5,493,286 A | * | 2/1996 | Grube et al. ............... | 340/7.25 |
| 5,564,018 A | | 10/1996 | Flores et al. | |
| 5,682,525 A | | 10/1997 | Bouve et al. | |
| 5,732,324 A | | 3/1998 | Rieger, III | |
| 5,742,769 A | | 4/1998 | Lee et al. | |
| 5,828,839 A | | 10/1998 | Moncreiff | |
| 5,850,433 A | | 12/1998 | Rondeau | |
| 5,852,810 A | * | 12/1998 | Sotiroff et al. ............... | 705/27 |
| 5,893,093 A | * | 4/1999 | Wills ............................ | 707/5 |
| 5,898,680 A | * | 4/1999 | Johnstone et al. ............ | 370/316 |
| 5,930,474 A | * | 7/1999 | Dunworth et al. ............ | 709/217 |
| 5,948,041 A | | 9/1999 | Abo et al. | |
| 5,990,886 A | * | 11/1999 | Serdy et al. .................. | 715/752 |
| 6,031,467 A | | 2/2000 | Hymel et al. | |
| 6,052,591 A | * | 4/2000 | Bhatia .......................... | 455/445 |

(Continued)

FOREIGN PATENT DOCUMENTS

EP 0 653 862 A1 5/1995

(Continued)

OTHER PUBLICATIONS

English-Language Abstract of European Patent Publication No. 653862A, 3 Pages (May 17, 1995— date of publication of application).

(Continued)

*Primary Examiner*—Bharat Barot
*Assistant Examiner*—Alicia Baturay
(74) *Attorney, Agent, or Firm*—Sterne, Kessler, Goldstein & Fox P.L.L.C.

(57) ABSTRACT

A communications system to post arbitrary information to any geographical region simply by outlining the region on a map in the system's user interface and attaching the information to the outlined region is provided. The outlined region can be of any size, e.g., a city block, a neighborhood, a county, and defines the information's "region of relevance". Any user of the system can also browse and receive these geographically relevant postings simply by identifying a point or region of interest on one of the system's maps. Uses of the system range from personal communication of questions and announcements to a geographically identified group, to governmental and commercial news and announcements aimed at a particular population, to "virtual billboards" for advertising.

51 Claims, 16 Drawing Sheets

U.S. PATENT DOCUMENTS

| | | | |
|---|---|---|---|
| 6,060,995 | A | 5/2000 | Wicks et al. |
| 6,119,098 | A | 9/2000 | Guyot et al. |
| 6,138,009 | A | 10/2000 | Birgerson |
| 6,144,944 | A | 11/2000 | Kurtzman, II et al. |
| 6,148,261 | A | 11/2000 | Obradovich et al. |
| 6,151,596 | A | 11/2000 | Hosomi |
| 6,161,130 | A | 12/2000 | Horvitz et al. |
| 6,161,142 | A | 12/2000 | Wolfe et al. |
| 6,169,897 | B1 | 1/2001 | Kariya |
| 6,182,050 | B1 | 1/2001 | Ballard |
| 6,183,366 | B1 | 2/2001 | Goldberg et al. |
| 6,184,878 | B1 | 2/2001 | Alonso et al. |
| 6,185,599 | B1 | 2/2001 | Salimando et al. |
| 6,185,610 | B1 | 2/2001 | Nagatomo et al. |
| 6,202,023 | B1* | 3/2001 | Hancock et al. ............ 701/201 |
| 6,205,432 | B1 | 3/2001 | Gabbard et al. |
| 6,219,691 | B1 | 4/2001 | Youn |
| 6,219,696 | B1 | 4/2001 | Wynblatt et al. |
| 6,233,428 | B1 | 5/2001 | Fryer |
| 6,237,022 | B1 | 5/2001 | Bruck et al. |
| 6,246,672 | B1 | 6/2001 | Lumelsky |
| 6,247,043 | B1 | 6/2001 | Bates et al. |
| 6,249,252 | B1 | 6/2001 | Dupray |
| 6,256,664 | B1 | 7/2001 | Donoho et al. |
| 6,321,158 | B1 | 11/2001 | DeLorme et al. |
| 6,324,472 | B1 | 11/2001 | O'Shea |
| 6,480,783 | B1 | 11/2002 | Myr |
| 6,490,521 | B1 | 12/2002 | Wiener |
| 6,522,875 | B1* | 2/2003 | Dowling et al. ......... 455/414.3 |
| 6,571,279 | B1* | 5/2003 | Herz et al. .................. 709/217 |
| 6,608,556 | B1* | 8/2003 | De Moerloose et al. .... 340/501 |
| 6,640,184 | B1* | 10/2003 | Rabe .......................... 701/207 |
| 6,654,800 | B1* | 11/2003 | Rieger, III .................. 709/223 |
| 6,772,213 | B1* | 8/2004 | Glorikian ................... 709/228 |
| 6,819,929 | B1* | 11/2004 | Antonucci et al. .......... 455/445 |
| 2002/0080167 | A1* | 6/2002 | Andrews et al. ............ 345/738 |

FOREIGN PATENT DOCUMENTS

EP            0 734 189 A2      9/1996

OTHER PUBLICATIONS

English-Language Abstract of European Patent Publication No. 734189A, 2 Pages (Sep. 25, 1996—date of publication of application).

English-Language Abstract of Japanese Patent Publication No. 11-053278, 2 Pages (Feb. 26, 1999—date of publication of application).

English-Language Abstract of Japanese Patent Publication No. 11-257976, 1 Page (Sep. 24, 1999—date of publication of application).

English-Language Abstract of Japanese Patent Publication No. 11-345184, 1 Page (Dec. 14, 1999—date of publication of application).

English-Language Abstract of Japanese Patent Publication No. 2000-041063, 1 Page (Feb. 8, 2000—date of publication of application).

English-Language Abstract of Japanese Patent Publication No. 2000-181814, 1 Page (Jun. 30, 2000—date of publication of application).

English-Language Abstract of Japanese Patent Publication No. 2001-016248, 1 Page (Jan. 19, 2001—date of publication of application).

English-Language Abstract of Japanese Patent Publication No. 2001-024689, 1 Page (Jan. 26, 2001—date of publication of application).

English-Language Abstract of Japanese Patent Publication No. 2001-077842, 2 Pages (Mar. 23, 2001—date of publication of application).

"The Industry Standard Events," IDG Communications, http://www.idglist.com/managedlists/emaillists/theindustrystrdevents.htm, [internet], Jul. 17, 2001.

"E-mail & Internet Options for Dashboarders," Roadtrip America, http://www.roadtripamerica.com/dashboarding/connecting.htm, [internet], Jul. 17, 2001.

"Spam and Bulk E-mail," NPT Nonprofits' Policy and Technology Project, http://www.ombwatch.org/npt/nptalk/may2001/spam.html, [internet], May 29, 2001.

"Main Strike Internet Services Bulk-E Broadcast E-Mail," Main Strike, http://www.mainstrike.com/mstservices/internet/brdemail/brdemaileng.html, [internet], Jul. 17, 2001.

"Electronic Filings on Internet Domain Names," http://www.ntia.doc.gov/ntiahome/domainname/email/7_22_97comments.htm, [internet], Jul. 22, 1997.

"New Research from The Kelsey Group and Constat Reveals Wireless Media Business Model Emerging," The Kelsey Group, http://www.kelseygroup.com/pr001003.htm, [internet], Oct. 3, 2000.

"DG.0 2000 Workshop Report," National Science Foundation, Los Angeles, CA, May 15-17, 2000.

"Toward Improved Geographic Information Services Within a Digital Government, Report of the NSF Digital Government Initiative Geographic Information Systems Workshop," The Board of Trustees of the University of Illinois, Jun. 1999.

Inernational Search Report issued Apr. 10, 2003 for Appl. No. PCT/US02/41220, 8 pages.

* cited by examiner

Account Information

User: Mary Smith

Email: mary.smith@aol.com  Update

Address (optional): 1234 Main St.
Bethesda, MD 23456  Update

Base antenna: Name: Home Lat: N38.23.04 Lon: 120.16.42  Change

Other antennas:

| Name | Latitude | Longitude | | |
|---|---|---|---|---|
| My Office | N38.50.04 | 77.15.42 | Change | Delete |
| Bill's Office | N38.52.18 | 77.48.23 | Change | Delete |
| Harker St. Palo Alto | N37.25.33 | 122.05.17 | Change | Delete |
| Dogwood Dr. McLean | N38.47.22 | 77.42.01 | Change | Delete |
| Reston Town Center | N38.47.26 | 77.55.26 | Change | Delete |

Named regions:

| Name | | |
|---|---|---|
| Our Neighborhood | Change | Delete |
| Greater McLean | Change | Delete |
| Reston Center | Change | Delete |

Notification Filters:

| Antenna | Post Category | Overlaps With | by % | Send as Email | | |
|---|---|---|---|---|---|---|
| Home | Any | Our Neighborhood | 50 | ✓ | Change | Delete |
| My Office | Community | Reston Center | 75 | ✓ | Change | Delete |
| Bill's Office | Community | Greater McLean | 75 | ✓ | Change | Delete |

FIG. 6

Fig 7B
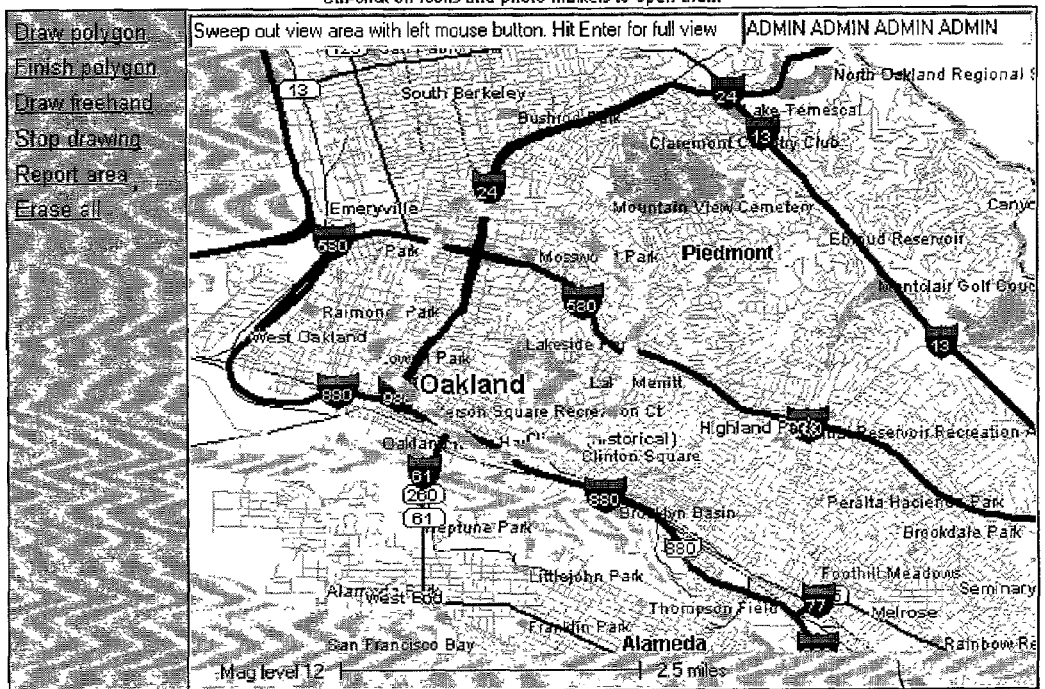

SYSTEM FOR COMMUNICATING THROUGH MAPS

CROSS-REFERENCE TO RELATED APPLICATIONS

This application is a continuation-in-part of U.S. patent application Ser. No. 09/524,888, entitled "System for Communicating Through Maps", filed Mar. 14, 2000, and incorporated herein by reference in its entirety.

STATEMENT REGARDING FEDERALLY-SPONSORED RESEARCH AND DEVELOPMENT

Not Applicable.

BACKGROUND OF THE INVENTION

This invention relates to the two-way communication of information, a "posting", from a source agent to a target user community via a computer server connected to a wide-area network such as the Internet. In particular, the target user community for a posting is defined in terms of geographical coordinates, e.g., by a bounded region on a map. Targeted users, i.e., those whose geographical location falls within the bounded region of a posting, receive notification of the posting either automatically via email, or by logging on to the server and browsing for geographically relevant notifications via a user interface.

The system described herein is intended to service mobile users as well as stationary users. Mobile users who pass through the targeted area of various postings can automatically receive those postings via their wireless connection as they travel, resulting in information automatically flowing to them at the posted information's point of relevance.

Related Art

At least three areas of technology are relevant to the present invention:

geographical product and services databases; one-way communication of information to its "point of relevance"; and communication of information via the Internet. However, the invention's overall purpose, methods, and implementation differ substantially from all known disclosures. Specifically, there is no known literature describing a communication system that targets unsolicited information to an anonymous user community identified only by a bounded region on a map.

SUMMARY OF THE INVENTION

It is a first feature of the invention to provide a method for associating arbitrary information with a geographical region of relevance, as defined, e.g., by a closed outline on a map. Information so associated with a geographical region of relevance shall be termed a "posting".

It is a second feature of the invention to provide a method for communicating the information content of a posting to individuals who are situated in, or who pass through, the posting's geographical region of relevance.

It is a third feature of the invention to provide a system that implements these methods and makes them accessible to a user community via a user interface designed to run in the context of a wide area network such as the Internet.

This invention empowers people to communicate with one-another through geography, rather than by individual identity. In a typical scenario, a user selects a target audience by drawing a closed outline around the target community on a map. The user then "posts" the desired information to the region thus identified on the map. Potential recipients of the information, i.e., those within the designated region, receive notification of the posting and can act on its information content in any appropriate way.

Example Societal Uses of this Invention are:

To ask questions of a local population. For example, if the target region is a neighborhood, a user could find a tennis partner, locate a desired item for sale, ask if any homes were on or about to come onto the market for sale, or ask a community-related question by "posting to the neighborhood".

To ask questions of a larger population. For example, if the target region is a city, one family could look for another family wishing to house-swap by posting a request to the region.

To initiate contact with individuals. If, for instance, the target is a particular home within a community, i.e., a very small geographical region, a user could communicate directly with the residents of the home without having any prior knowledge about them.

To post community or regional announcements. State, county, and local organizations could post news about topical events to residents in relevant regions.

To post traffic and road construction news. Mobile users could automatically receive news about traffic and road conditions relevant to a city block, an interchange, or a commuting corridor as they passed through.

To advertise. The system can be used to implement "virtual billboards".

Businesses wishing to get their message out could post advertisements to specific regions, e.g., several city blocks, or a long narrow region covering a particular section of an interstate highway. Mobile users passing through such regions would automatically receive the information.

To educate and inform. The National Park Service could, for example, post information about sites of historical interest. Vacationers, connected to the Internet via wireless, would receive such information when visiting the site, or prior to visiting by browsing the system's maps.

Further features and advantages of the present invention, as well as the structure and operation of various embodiments of the invention, are described in detail below with reference to the accompanying drawings. In the drawings, like reference numbers generally indicate identical, functionally similar and/or structurally similar elements. The drawing in which an element first appears is generally indicated by the leftmost digit(s) in the corresponding reference number.

BRIEF DESCRIPTION OF THE DRAWINGS

FIG. 6 is an illustration depicting an account information user interface screen in accordance with an embodiment of the present invention.

FIGS. 7A–7C depict a new message entry via a user interface screen in accordance with an embodiment of the present invention.

DETAILED DESCRIPTION OF THE INVENTION

Table of Contents 1.0 Overview of the Invention
2.0 Exemplary System Characteristics
  2.1 Computer System Embodiment
  2.2 Data Representation
3.0 Exemplary System Operation
  3.1 Map Servers
  3.2 Personal Icons
  3.3 Visible Antennas and URL Links
    3.3.1 Representing Antennas
  3.4 Ping Topics and Ping
    3.4.1 Representing Ping Topics
  3.5 Attaching Photos Directly to the Maps
    3.5.1 Representing and Managing Photos
  3.6 Channels and Tuning-In
    3.6.1 Representing and Managing Channels
  3.7 Representing Regions
  3.8 Managing Dialogs
  3.9 Managing Users and the Log-on Process
    3.9.1 User Account Types
    3.9.2 User Account Information
4.0 Representing Postings
4.1 Representing Posting Proxies
4.2 Representing Receptions
5.0 Exemplary System Usage
  5.1 The Posting Process
  5.2 The Ping Process
  5.3 The Roam Check-In Process
  5.4 The Dialog Process
6.0 Conclusion 1.0 Overview of the Invention The present invention provides a communications system to post arbitrary information to one or more geographical regions. The information is posted by outlining or otherwise identifying the region(s) on a map in the system's user interface and attaching the information to the outlined region. The outlined region can be of any size, e.g., a city block, a neighborhood, a county, and defines the information's "region of relevance". Any user of the system can also browse and receive these geographically relevant postings simply by identifying a point or region of interest on one of the system's maps. The system is useful for facilitating personal communication of questions and announcements to a geographically identified group, to providing governmental and commercial news and announcements aimed at a particular population, and for presenting virtual billboards for advertising.

2.0 Exemplary System Characteristics 2.1 Computer System Embodiment

The present invention provides a communications system to enable anonymous communication between one or more users.

Figure 1:
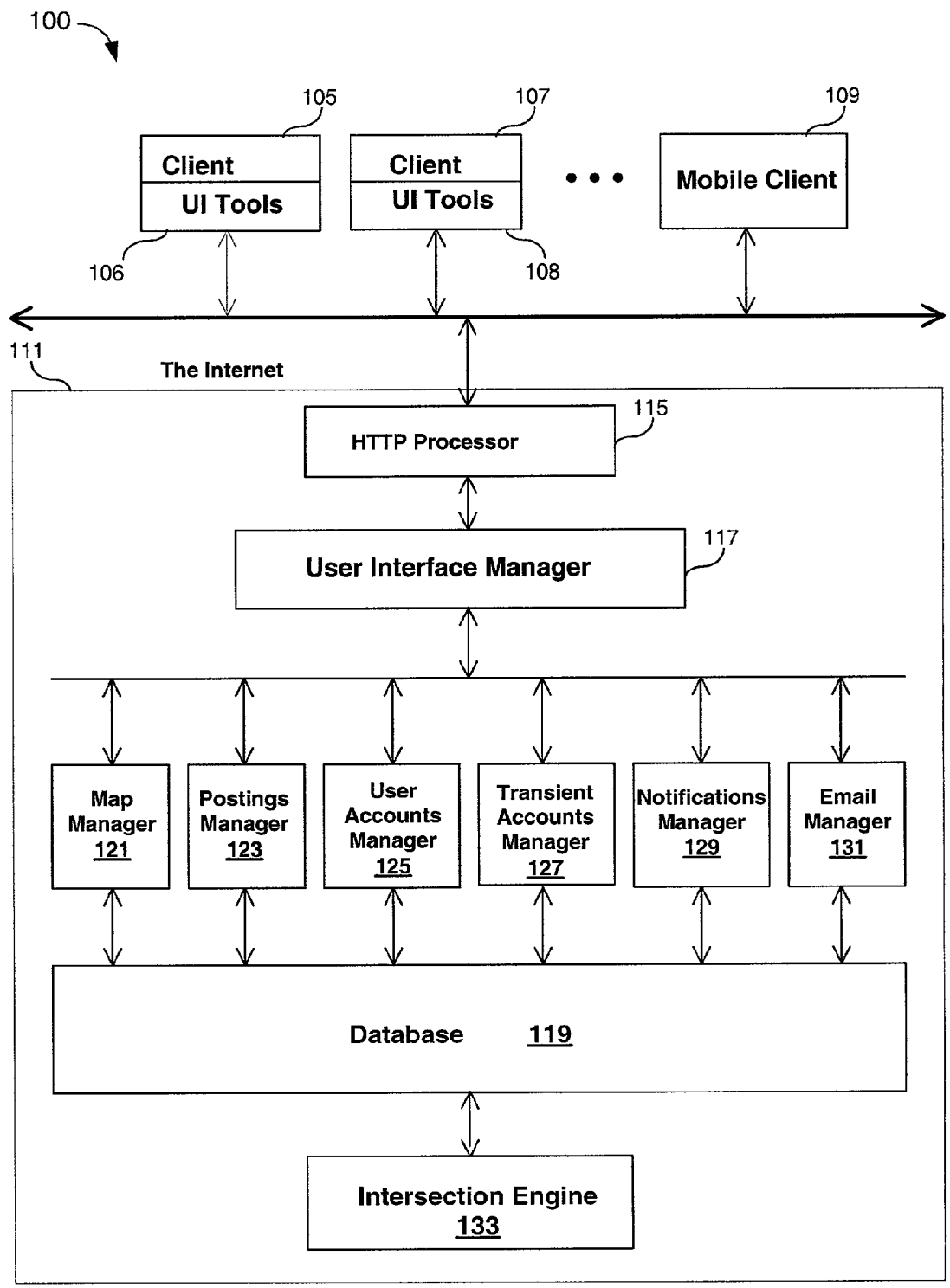
FIG. 1 is a block diagram of a communications system according to an embodiment of the present invention.

Referring to FIG. 1, in an embodiment of the present invention, a communications system 100 is comprised of a communications server 111, one or more mobile clients 109, and one or more stationary clients 105 and 107. In accordance with this embodiment, the communications server 111 is implemented as a World Wide Web server, although in practice, server 111 could be part of any type of communications network. Stationary clients 105 and 107 and mobile clients 109 connect to the communications server 111 over a network (such as a local area network, a wide area network, point-to-point links, the Internet, etc., or combinations thereof). Where the Internet is used, stationary clients 105 and 107 and mobile clients 109 communicate to the communications server 111 via Hypertext Transfer Protocol (HTTP) using standard Web browsers. Stationary clients 105 and 107 can be for example, general purpose computers. Mobile clients 109 can be for example handheld personal computers, Personal Data Assistants, or the like.

The communications server 111 is organized among a series of geographical maps that cover the intended service area, e.g., county, metropolitan area, state, country, or world, to a sufficient level of visual detail. These maps serve as the basis of much of the communications system's 100 user interface (UI).

The communications server 111 is further comprised of a HTTP processor 115 and a map manager 121. The HTTP processor 115 provides for communication between the communications server 111, the mobile clients 109, and the stationary clients 107 to communicate via HTTP. The map manager 121 manages the maps covering the communications system's 100 intended service area.

A user interface 117 is also included with the communication server 111. The user interface 117 processes user transactions, and dynamically composes HTML responses containing maps and other graphical elements (such as icons, photos, and the like), drawing in part upon the communications servers's 111 map manager 121. The user interface 117 permits users to interact with the communications system's maps via zoom, pan, and drawing primitives, which are implemented partially on the communications server 111 side and partially on the client 105 or 107 side, e.g., through Java classes 106 and 108 that are automatically made available when the user connects from a stationary client. Mobile users would interact with the communication system 100 via an interface appropriate to the particular technology of the mobile clients 109 communication devices.

The communications server 111 is further comprised of a database 119. The database 119 stores information about postings, permanent and transient user accounts, notifications, email addresses, etc., and is the storage backbone of the communications system 100.

A postings manager 123 is further included with communications server 111.

Postings manager 123 stores and retrieves information about postings on demand from the user interface 117.

The system maintains a postings information database for storing postings. Each posting is comprised of an identification tag that describes who has posted it, when it was posted, what its posting category is, and other such factual information about its origin. Examples of posting categories are "Personal", "Neighborhood", "Community", "Governmental", "Commercial", "Educational", and so forth. Each such category might be further refined by subcategories, e.g., Governmental/Road_Construction.

Postings are further defined by an information component, which is the content of the posting. As with ordinary email, this component could be just a simple textual message, or it could include a reference to one or more Web pages containing graphics, audio, links, etc.

Each posting is also provided with a "broadcast" descriptor, which identifies the posting's geographical target region(s). In an embodiment, this descriptor would be represented by a closed geometrical object such as a polygon or circle in a 2-dimensional geographical coordinate space, although it could also include 3-D elevation information as well. Users would typically define such a region by using the communications system's 100 user interface 117 to outline it on one of the communications system's maps. The system would also support compound regions, i.e., regions identified by more than one bounded object on the system's maps.

The system can also manage an optional password on any posting. For any posting with a password, the system would require any user wishing to view or receive the posting's information content to present the correct password before allowing the user access to the posting's content. This feature would be most useful for communications among a group of closely-knit users, such as the residents of a neighborhood or community.

Administrators of the communications system 100 can restrict the nature of postings created by any particular user by defining geographic regions into which the user is either authorized or unauthorized to post. Authorized regions can be assigned optional passwords and posting category restrictions that further narrow the user's posting privileges in those regions. These controls would, for example, permit system administrators to grant specific privileges to a regional authority to create postings of particular categories, e.g., Governmental/Traffic, Governmental/Weather, to particular regions, while excluding all other users from posting those categories to the regions.

The communications server 111 is also comprised of a user accounts manager 125. The user accounts manager 125 stores and retrieves user account information on demand from the user interface 117.

In an embodiment, user account information is maintained in a database. Each user account is comprised of a user identification component, which describes the user's identity, e.g., name, email, address, etc., as well as operational preferences and settings, such as whether or not automatic email notification of relevant postings is desired.

The user account is further comprised of an "antenna" descriptor, which describes the user's "base" location, e.g., the location of the user's residence, in geographical coordinate space. A user would typically define this antenna descriptor by drawing an outline or cross hair on one of the system's maps. In addition to the antenna descriptor for the base location, each user account would be capable of maintaining a list of additional antenna descriptors, permitting the user to intercept postings relevant to multiple locations of interest.

Each user account also includes a notification list, which records postings whose broadcast descriptor has intersected with one or more of the user's antenna descriptors.

This list makes the connection between the user and postings that are determined to be relevant to that user.

Still further, each user account can also maintain a user-defined list of named regions. The user can add new regions to this list by drawing an outline on the system's map, then giving the outlined region a name. Once defined, a named region can then be used either in conjunction with reception filters (described below), or as the broadcast descriptor for a new posting.

A transient accounts manager 127 tracks users who have connected to the communications server 111 but who have no registered accounts, and is responsible for creating a transient account when such a user connects for the first time, and for garbage collecting the transient account after a suitable period of inactivity.

Through transient accounts manager 127, the communications server 111 is capable of managing a transient antenna descriptor for any user account, i.e., an antenna descriptor that would correspond to the continually changing location of a mobile user. In typical use, the mobile user's PC or cell phone would have access to Global Positioning System (GPS) technology, and would know its location at any given moment. A mobile client 109 would periodically connect to the communications server 111 via its wireless channel to the Internet, e.g., every several minutes, and would identify itself as a mobile client 109, give its user account ID, if any, and indicate its current GPS coordinates. The communications server 111 would record and track this continually changing location via the transient antenna descriptor, and would send any non-redundant postings relevant to the current location at each check-in time. The communications server 111 would also be capable of deducing the user's approximate route in-between check-in points, and would automatically find and send any postings deemed to have been appropriate in the missed intervals.

Transient accounts manager 127 is further used for servicing anonymous users, i.e., those with no registered account. Such users could place themselves at arbitrary points on the communications system's maps and browse the relevant postings at those points. For unregistered mobile users, the communications server 111 would set up and maintain a temporary account, including a transient antenna descriptor, that would time out and be garbage collected after some predefined period of inactivity.

The communications server 111 is further comprised of an intersection engine 133. Intersection engine 133 is a pattern-matching engine that constantly runs as a background process. This engine is capable of finding intersections between broadcast descriptors and antenna descriptors, system-wide. Upon finding an intersection for the first time, the engine adds the posting to the notification list of the relevant user account, noting which of the user's antenna descriptors "received" the posting.

Each user account can accept and store "reception filters", which describe the content type and/or broadcast descriptor constraints that any posting must satisfy in order for the pattern matching engine 133 to add it to the user account's notification list.

Broadcast descriptor filters would, for example, be capable of filtering out postings whose target region was too broad, by requiring that the posting's target area be under a specified size in square miles in order to qualify for reception. Another type of filter would require that the broadcast region have a minimal overlap, e.g., 75%, with some user-specified region such as the user's neighborhood.

A notifications manager 129 is capable of presenting notifications to users on demand from the UI 117 as users browse for relevant notifications.

The communications server 111 is also provided with an email manager 131.

Email manager 131 detects the presence of any newly generated notifications that, based upon user preferences, should trigger email, and is responsible for sending email to relevant users.

The communications server 111 permits any user account to accept and store preferences governing the disposition of accumulated notifications. One such preference, for example, would direct the server 111 to forward some or all notifications to the user as ordinary email. In this case, the end effect would be that the user receives direct email from other users whose postings have intersected one or more of the user's antenna descriptors. Regardless of whether or not such automatic email has been enabled, the server would always permit a user to log on and manually browse notifications, or to browse arbitrary regions of the systems maps for postings relevant to those regions. Further description of the features of the communications system will now be described with reference to FIG. 2.

Figure 2:
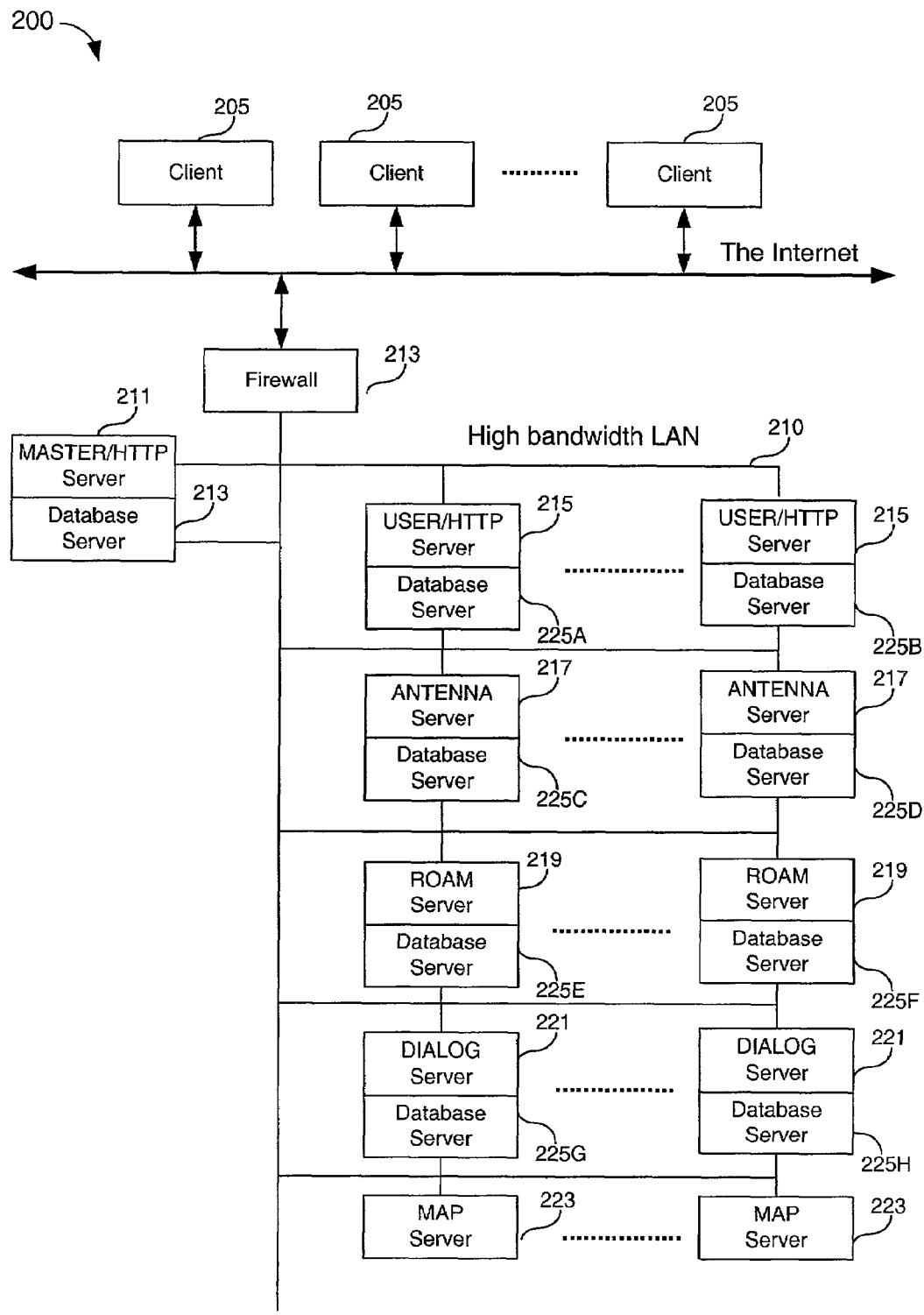
FIG. 2 is a block diagram of a communications system according to another embodiment of the present invention.

In another embodiment a communications system 200 is implemented in a 3-tier architecture. As shown in FIG. 2, a 3-tier architecture embodiment of the present invention is comprised of: one or more thin clients 205, a middle-tier HTTP server 211 that responds to thin client 205 requests and implements the communications system's 200 business logic, and a distributed, scaleable SQL database tier 213.

In the disclosed embodiment, the thin client 205 runs inside a standard Web browser such as Microsoft's Internet Explorer, and relies on HTML, JavaScript, and Java applet technologies. The middle-tier HTTP server 211 is implemented using such technology as Java servlets or Active Server Pages. The distributed SQL database 213 is implemented using such technology as Microsoft or Oracle SQL servers.

In the disclosed embodiment, there are additional middle-tier servers that are capable of performing specific system functions, such as managing user subsets and their resources, composing map views, and so forth. Each such server can be requested to perform one or more of six logically distinct server roles: USER, ANTENNA, DIALOG, ROAM, MAP, and MASTER, as described in sections following. Accordingly, FIG. 2 depicts a plurality of USER servers 215, ANTENNA servers 217, ROAM servers 219, DIALOG servers 221, and MAP servers 223. USER servers 215 and the MASTER server 211, will typically also serve as the middle tier's HTTP servers. The middle-tier servers communicate with one another over a high bandwidth network 210. An exemplary network 210 is a local area network. The goal of distributing functionality across many servers in this way is to maintain good performance and reliability as the system grows. Based on average anticipated usage levels, it is estimated that one server employing a 1 GHz PC with 40 GB disk storage can adequately support 20,000–40,000 users. Thus, if the system grew to 20 million users, there would perhaps be 500–1000 such servers, each performing one or more of the indicated server roles, and all interconnected via a high bandwidth LAN backbone at the system's physical site.

As embodied in FIG. 2, clients 205 connected via the Internet, contact the communications system's 200 HTTP servers 211 and 215 through a firewall 213.

MASTER server 211 supervises user log-ons. The MASTER server's 211 database contains global system information, such as the identities and addresses of the other servers, the master list of user names, passwords, and email addresses, and so forth. Once a user is logged on, the MASTER server 211 redirects the client 205 to an appropriate USER server 215, which controls the remainder of the session until the user logs off or times out because of inactivity. During the course of a user session, various other servers (217, 219, 221, and 223) will be called upon to perform database searches and other specialized computations in support of user actions and requests. Many of the physical servers (211, 215, 217, 219, 221, and 223) also house database servers 213 and 225 (denoted individually as 225A–225H). Each of these database servers 225 contains the subset of the communications system's 200 overall database that is relevant to the specialized functions the physical server performs. All database servers 225 are accessible on the LAN, so that system functions requiring information from several distinct database servers can have seamless access to that information.

Computer programs or computer control logic is stored in memory (not shown). When executed, these computer programs enable the communications system 200 to perform the functions of the present invention as described herein. In particular, the computer programs enable a processor 111 to perform the functions of the present invention. Accordingly, such computer programs represent controllers of the communications system 200.

In an embodiment, the features of the present invention are centralized in a single computer system such as communications server 111. In other embodiments, the functions of the present invention are distributed among multiple computer systems as described in reference to FIG. 2, for example. The invention is not limited to these example embodiments. Other implementations of the communications system will be apparent to persons skilled in the relevant arts based at least is part on the teachings contained herein.

2.2 Data Representation

In an embodiment, all system objects including users, antennas, regions, dialogs, map photos, ping topics, channels, and so forth, are implemented within the server tier as instances of object classes in a programming language such as Java. SQL database tables provide the persistent storage for all instances of each type of object. For example, if an antenna has been defined, then it will be represented in the server's runtime environment as an instance of the Antenna class, and its persistent storage is one row in the SQL database's Antennas table. Persistent storage for some objects will involve linked rows in other tables. For example, when a user channel is defined, its broadcast region may actually consist of several named regions the user has previously defined. In this case, each associated Region object is represented by a row in the Regions table, and is linked to the row representing the user-defined channel in the Channels table. Enumeration of such class objects and corresponding database tables that are sufficient for implementing the functionality of a system as disclosed herein will be provided further below.

3.0 Exemplary System Operation 3.1 Map Servers

In an embodiment, one or more middle-tier servers are identified as MAP servers 223. Each MAP server 223, as with each server of other types, is represented in a main servers database table as depicted in TABLE 1.

TABLE 1

SERVER TABLE 280

| FIELD | DESCRIPTION |
|---|---|
| Name | Server's logical server name |
| ComputerName | Server's physical computer name |
| IPAdress | Server's numerical IP address |
| InService | Whether or not the server is active |
| ServiceRoles | List of logical roles the server plays |
| TempDirectory | Server's temp file directory |
| AssetsDirectory | Server's system resources directory |
| MapDirectory | Server's map directory, if appropriate |
| BlobDirectory | Server's blob storage directory |
| HomePagesDirectory | Server's hosted home pages directory |
| ReceptionsCacheDirectory | Server's receptions cache directory |
| MailHost | Address of mail host for this server |

MAP servers 223 are dedicated to composing map views on demand from the client tier. A view is defined as a rectangular area of interest on communications system's 200 national street map. Map data, comprising such elements as road and street segments and names, town, city, and feature coordinates and names, and so forth is organized by states and counties (or similar units) and stored as files.

When requested to compose a view, a map server 223 accesses the relevant map data and composes the view at one of a fixed number of "magnification" levels (implied by the request).

The map server 223 then returns the results to the client in a suitable format, e.g., a GIF file, or a compressed byte stream that can be interpreted by a Java applet running in the client tier. For low magnification levels, e.g., views that encompass a very large part of the national map, the communications system 200 also makes use of pre-computed views, which can be assembled to match requested views, thus avoiding excessively long computations.

In addition to the fixed geographical map data, a MAP server 223 can also dynamically include features that derive from the communications system 200 itself, e.g., visible Antenna objects, and MapPhoto object markers.

3.2 Personal Icons

In an embodiment, communications system 200 has a UI that permits a user to define a personal icon, which can be attached to postings and other user-related messages throughout the system. Such icons are typically bitmap graphics represented in such standard industry formats as JPEG, GIF, and BMP, which the system stores and associates with the user's account. Once defined, User interfaces in various parts of the communications system 200 then give the user the option of attaching this personal icon to postings and the other types of system-provided communications described in sections below.

3.3 Visible Antennas and URL Links

The communications system 200 also permits a user optionally to make one or more user antennas visible on the systems map UI. When visible, the relevant antenna is visually represented either by the user's personal icon, if defined, or by other graphical techniques made available to the user. In an embodiment, unlike physical antennas, the antennas of the present invention are virtual. When browsing the map, users will see all such visible antennas. Visible home antennas are felt to be particularly relevant to commercial users, who will want to establish their visual "point of presence" on the map.

The communications system 200 also includes a UI that will list all visible antennas within the current map view, representing each with a "banner line" that has been defined by the user and associated with the visible antenna. Each banner line is presented as a URL, which, when followed, will zoom a user in to a map view of the associated visible antenna.

Once a user has made an antenna visible on the map, the user also has the option of associating a URL with the antenna itself. When such a URL has been defined, the communications system 200 permits other users to link to the antenna's URL, e.g., display the target HTML page in a secondary pop-up browser window, via an action such as Ctrl-clicking the antenna's visible graphical element. This capability makes it extremely easy for users to spot a commercial user (a business) on the map and link directly to that user's home page simply by clicking on the visible antenna's icon. The communications system 200 is also capable of accepting a user-provided home page and internally hosting that home page, for users who have no other Web presence.

3.3.1 Representing Antennas

In an embodiment, each antenna is represented by an Antenna object depicted below in Table 2. Each such object identifies the owning user via a reference to a User object (Table 3), the antenna's geographical coordinates, the antenna's name, and certain additional properties such as whether or not the antenna is to be visible on the map.

TABLE 2

ANTENNA TABLE 110

| FIELD | DESCRIPTION |
|---|---|
| ID | Unique ID |
| UserID | ID of user that owns the antenna |
| AntennaType | "Home", stationary or mobile |
| Name | Antenna's name |
| X | Geographical longitude |
| Y | Geographical latitude |
| CreateDate | Date/time of antenna's creation |
| Flags | Antenna option lags |
| DisplayStyle | Visible/non-visible, and display style |
| DisplayText | Display text, if applicable to style |
| LinkURL | URL to use when antenna icon clicked |
| LinkHomePageID | ID of system-hosted home page, if any |

TABLE 3

USER TABLE 310

| FIELD | DESCRIPTION |
|---|---|
| ID | Unique ID |
| NamePrefix | e.g., "Mr", "Mrs" |
| FirstName | User's first name |
| MiddleName | User's middle name, if supplied |
| LastName | User's last name |
| NameSuffix | e.g., "Jr", "III" |
| Nickname | User's preferred nickname |
| Address1 | Address line 1 |
| Address2 | Address line 2 |
| City | City |
| State | State |
| ZipCode | Zip code |
| Country | Country |
| SignupDate | Date/time user joined the system |

TABLE 3-continued

| USER TABLE 310 FIELD | DESCRIPTION |
|---|---|
| AccountType | Subscription type |
| AccountStartDate | Date/time when subscription type began |
| AccountStatus | e.g., "Current", "Past due" |
| ActivationKey | Initial entry key to use on first log-in |
| ActivationKeySent | Internal flag (activation key emailed yet) |
| Preferences | User preference settings |
| Privileges | User privileges within the system |
| AntennaServer | ID of user's home antenna server |
| IconID | ID of blob that contains user's icon |
| HomePageID | ID of blob for internal home page |
| HomeURL | URL of user's home page, if any |
| LogonCount | How many times the user has logged on |
| LastLogonDate | Date/time of last logon |
| HomeX | Geographical longitude of home antenna |
| HomeY | Geographical latitude of home antenna |
| LastXMin | User's last map view area |
| LastYMin | etc. |
| LastXMax | etc. |
| LastYMax | etc. |

Each antenna can be selectively enabled or disabled to receive messages on various channels by the presence of one or more SelectedReceiveChannel objects depicted in Table 4.

TABLE 4

| SELECTED RECEIVE CHANNEL TABLE 270 FIELD | DESCRIPTION |
|---|---|
| DualKey | Combo key for fast lookup |
| AntennaID | ID of relevant antenna |
| ChannelID | ID of relevant channel |
| EnableEmail | Whether to forward receptions via email |

Each Selected Receive Channel object logically associates a Channel object depicted in Table 5 to the Antenna object. These associations are used during the posting broadcast process, as described earlier. A SelectedReceiveChannel object also records whether or not the user wants to have receptions on that channel forwarded to the user's standard email address.

TABLE 5

| CHANNEL TABLE 130 FIELD | DESCRIPTION |
|---|---|
| ID | Unique ID |
| ParentID | Parent channel ID |
| ChannelType | Channel type, e.g., "public", "user", etc. |
| Name | Channel's name |
| Description | Optional description |
| IconName | Icon file name to use in selection UI |
| UserID | ID of owner if channel type is "user" |
| CreateDate | Date/time when created (if user) |
| Xmin | Broadcast region bounding area (if user) |
| Ymin | etc. |
| Xmax | etc. |
| Ymax | etc. |

3.4 Ping Topics and Ping

Figure 3:
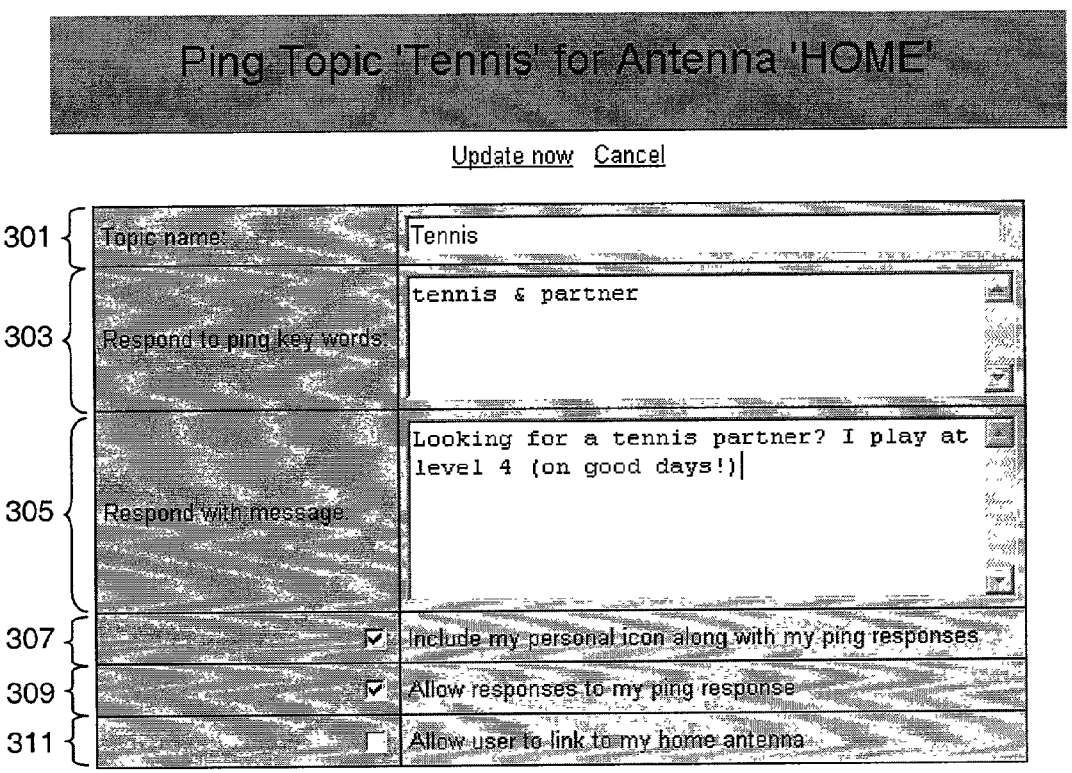
FIG. 3 is an illustration depicting a ping topic user interface screen according to an embodiment of the present invention.

The communications system 200 also permits a user to associate keyword patterns with one or more of the user's antennas. A keyword pattern comprises one or more keywords logically connected by logical operators such as "and", "of", and "not" Associated with each keyword pattern is an arbitrary message from the user. Such pattern/message pairs are referred to as "ping topics", and each ping topic has a name (title). One or more ping topics can optionally be associated with any user antenna. An example of a ping topic will be explained with reference to FIG. 3

In block 301, a user is able to enter the name for a ping topic. In this example "Tennis".

In block 303, the user enters the keywords forming the keyword pattern for the ping topic. Here, the keywords "tennis" and "partner" are used along with the logical operator "and".

In block 305, the user is asked to enter the arbitrary message the user wishes to send in response to a ping. In this case, the user has entered "Looking for a tennis partner? I play at level 4 (on good days !)".

In an embodiment, the antenna's owner can also define behavioral preferences for any ping topic. Behavioral preferences control the format in which the antenna topic's response is returned when hit by a ping. Three examples of such behavioral patterns are "Include personal icon in the ping response" 307, "Allow responses to my ping response" 309, and "Allow user to link to my home antenna" 311.

The first option 307 would cause the personal icon of the responding antenna's owner to be included in the ping response.

The second option 309 would allow the recipient of the ping response to reply back to the antenna's owner, thus initiating a dialog.

The third option 311 would include a link in the ping response, which, when clicked, would take the ping response recipient directly to the antenna's visible icon on the map. Behavioral ping topic options such as these are considered to be powerful tools for commercial users who want to use ping topics to advertise goods and services, and who want to make it easy for users to find their icon and optional home page link on the map. In response to the user's input, the communications system 200 will create a PingTopic object as explained in the next section.

3.4.1 Representing Ping Topics

Each Antenna object can optionally have a number of associated PingTopic objects. The PingTopic objects are depicted in Table 6.

TABLE 6

| PING TOPIC TABLE 200 FIELD | DESCRIPTION |
|---|---|
| ID | Unique ID |
| AntennaID | ID of antenna to which topic belongs |
| Name | Ping topic's name (title) |
| CreateDate | Date/time ping topic was created |
| Keywords | Ping topic keyword expression |
| KeywordsID | ID of text blob if keywords are large |
| Response | Response message to return when hit |
| ResponseID | ID of text blob when response is large |
| Flags | Behavioral flags |

Each Ping Topic object comprises (1) a title, (2) a keyword expression that will be involved in ping pattern matching, (3) a ping response message to be returned when a ping event matches the keyword expression, and (4) certain behavioral flags. Examples of behavioral flags are whether or not the antenna's owner wants to be able to receive responses from users who have successfully pinged the antenna and received its response message, whether or not other users should see the antenna owner's identity, and so forth.

3.5 Attaching Photos Directly to the Maps

In an embodiment, the present invention permits a user to attach one or more photographs to the map. The photographs can be for example, JPEG, GIF, TIFF or other similarly formatted images. To attach photographs, a UI collects information similar to that which is collected for the message component of a posting, namely a title (subject), a description (body), and certain behavioral options such as whether other users should be able to send messages to the map photo's owner. This UI also permits the user to mark the attachment point on the map and optionally indicate a viewing direction (relevant when the photo depicts a view of the surroundings from that map point) and a photo category, e.g., "View of a Residence", "View of a City Block", etc. Having collected this information, the client tier sends the request to the server tier, which in turn creates a new MapPhoto object shown in Table 7.

The MapPhoto object will then be available to the communications system's 200 MAP servers 223 when composing map views. As a result, users will see the map photo marker when browsing the map (at a sufficiently high magnification level).

Figure 4:
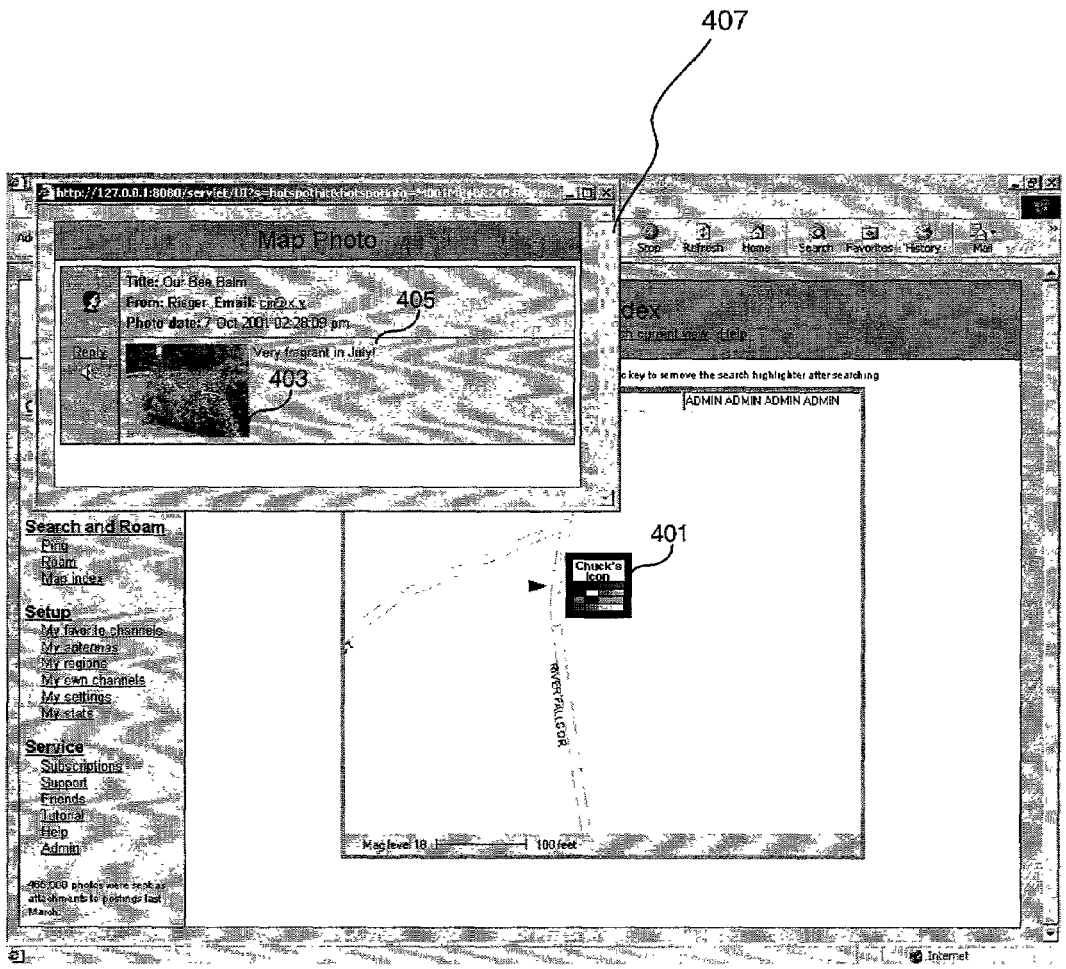
FIG. 4 is an illustration depicting a visible icon representing a user's home antenna on a map, as well as a marker denoting the presence of a photograph that has been attached to the map in accordance with an embodiment of the present invention.

Each attached photo is represented on the map by an icon that is visible to users as they browse the map. FIG. 4 provides an exemplary illustration of what a user would see.

When selected in a suitable way, e.g., by Ctrl-clicking the photo's icon 401, the communications system 200 displays the photo 403, its message 405, and any supporting elements, typically in a pop-up browser window 407.

The owner of a map photo can remove the photo from the map at any time.

Additionally, MapPhoto objects can have an optional lifetime. An ongoing background thread looks for expired MapPhoto objects and deletes any it finds.

TABLE 7

MAP PHOTO TABLE 180

| FIELD | DESCRIPTION |
| --- | --- |
| ID | Unique ID |
| UserID | User who owns the map photo |
| MessageID | ID of message associated with photo |
| X | Geographical longitude of photo |
| Y | Geographical latitude of photo |
| Direction | View direction (e.g., "N", "NW", . . . |
| ContentType | Photo type, e.g., "residence", "town", . . . |
| ExpireDate | Date/time at which the photo expires |

3.6 Channels and Tuning-in

The present invention provides multiple channels, which permit a user to describe what types of postings to receive on the user's antennas. In an embodiment, there are two general types of channels: "system" and "user".

A system channel describes a general activity, interest, or sender type. Examples of system channels are "Community News", "Local Emergency Agencies", "Fast Food (Burgers)", "Personal Search", and so forth. The system has dozens or hundreds of such system channels, which characterize various topics of potential interest to all users. In the disclosed embodiment, system channels have no geographic basis themselves, but rather serve to characterize a posting when it is sent into a user-defined geographic region. Each posting in the new system must be sent on a specific channel.

Figure 5:
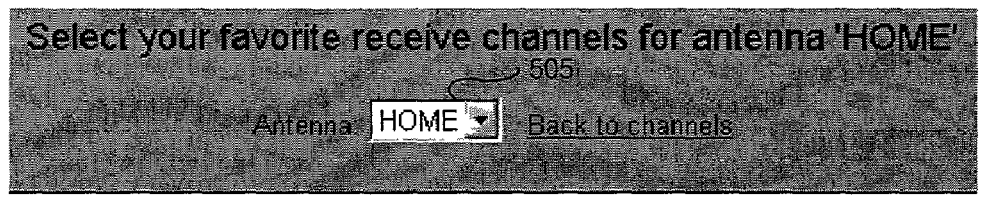
FIG. 5 is an illustration depicting a receive channel user interface screen in accordance with an embodiment of the present invention.

All users can see all available system channels via a channel guide presented via the system's channel tree UI. FIG. 5 provides an illustration of an exemplary channel tree in accordance with an embodiment of the present invention.

For each of the user's antennas, the user can selectively tune each system channel in or out via the channel guide UI 501. System channels 503 provide a basic level of filtering for the types of postings an antenna will receive. If for example, the home antenna, selected in 505, is tuned in to a channel 503 by selection of the channel's corresponding box, then any posting sent over the selected channel would be received by the home antenna (providing the posting's region included the home antenna). Postings sent over channels 503 that have not been selected will not be received. In this way the communications system 200 becomes "permission-based", since all users have complete freedom to define what it is they want to receive on their antennas.

User channels differ from system channels in two important ways. First, there is no a-priori collection of user channels; they are instead created and named by individual users. Any user with suitable authority, i.e., an appropriate subscription package, can create one or more user channels, which that user then "owns". Second, user channels have a geographic component. When creating a user channel, a UI prompts the user for (1) a system-wide unique name for the channel, (2) a "parent" system channel in the channel tree, and (3) the channel's geographic extents, i.e., its "broadcast area".

For each user Channel object, there will be one or more Region objects (described below), which collectively describe the channel's broadcast area.

The "parent channel" property of a Channel object permits channels to be organized hierarchically by categories. This allows users to browse the system's channel tree UI 501 to find goods, services, news, etc. of interest when selecting the channels to be tuned in by a particular antenna. Hence, when a user creates a new channel, the user is requested to place the new channel at the appropriate point in the channel hierarchy. For example, if a new channel is a commercial channel owned by a pizza retail shop, then the owner would typically place the new channel under the abstract system channel "Fast Food, Pizza Coupons" where it will be readily found by users who may wish to tune in to it.

Once defined, a user channel will pop into view in the channel guide (under the appropriate parent channel) for all antennas that lie within the channel's broadcast area. For example, if a commercial user in the Washington, D.C. area defines "The Merrifield Home Depot Channel", then only users who have an antenna situated in the channel's broadcast area around Merrifield, Va. will see the channel as a choice in their channel guides. Users in San Francisco, and everywhere else outside the broadcast area, will not see the channel in their channel guides. When visible in a user antenna's channel guide, the user has the option of tuning in or tuning out the user channel.

User channels thus provide a refined way for commercial users to reach their most geographically relevant prospective customers. Businesses can employ user channels to broadcast electronic coupons and news about special deals, for example. News agencies can broadcast neighborhood-specific news to precisely targeted user groups, and so forth.

User channels are therefore an abstract analog of physical radio and TV stations, although user channels afford a more precise control over the broadcast area than their real-world counterparts.

3.6.1 Representing and Managing Channels

In an embodiment, each broadcast channel is represented by a Channel object illustrated in Table 5. Each broadcast channel is comprised of a name, a description, a type, and a reference to a "parent channel". Additionally, if a channel is a user channel, i.e., one that has been created and named by a user, the Channel object will also contain a reference to the user, the creation date, and information about the channel's broadcast region extents.

In an embodiment, there are at least four system channel types, "abstract", "public", "commercial", and "restricted", as well as "user" channels. "Abstract" system channels cannot actually be sent on, but rather serve to define general categories in the channel tree hierarchy, e.g., "Community Services", "Emergency News", "Fast Food Coupons". Other channels representing sub-categories will exist beneath each abstract channel. "Public" system channels are available to all users. "Commercial" system channels are available only to users with appropriate account types. "Restricted" system channels are assigned at the discretion of system administrators, and are made available only to users who have positively identified themselves as relevant uses of the channel, e.g., the "McLean Va. Police Emergency" channel. Restricted channels will generally have an associated broadcast region, defined by one or more Region objects agreed to by system administrators. Restricted channels are somewhat analogous to certificates of trust, in that they represent trusted sources.

As previously explained, user channels are those that have been created and named by users with an appropriate subscription package. User channels have intrinsic broadcast regions, which are defined by one or more user-supplied Region objects, which are associated with the user channel via ChannelRegion objects depicted in Table 8.

TABLE 8

| CHANNEL REGION TABLE 140 FIELD | DESCRIPTION |
|---|---|
| ChannelID | ID of relevant channel |
| RegionID | ID of relevant region ("broadcast area") |

Public and commercial channels do not have intrinsic broadcast regions, since each posting sent on such channels will define its own broadcast region via one or more Region objects supplied by the sender at posting time.

The system further provides a UI that permits a user to identify a set of "favorite send" channels from the channel tree. The list of favorite send channels, each represented by a FavoriteSendChannel object (Table 10), is displayed as the first step of the posting process, although the user also has the option of selecting a posting's send channel directly from the channel tree.

TABLE 10

| FAVORITE SEND CHANNEL TABLE 160 FIELD | DESCRIPTION |
|---|---|
| UserID | ID of relevant user |
| ChannelID | ID of relevant "favorite" channel |

3.7 Representing Regions

In the disclosed embodiment, each region in the system defines a (possibly compound) bounded area on the map, and is represented by a Region object (Table 11), which comprises one or more closed polygons in the map's coordinate system.

TABLE 11

| REGION TABLE 260 FIELD | DESCRIPTION |
|---|---|
| ID | Unique ID |
| UserID | ID of user who owns this region |
| Name | Region's name |
| CreateDate | Date/time of region's creation |
| Xmin | Region's bounding rectangle |
| Ymin | etc. |
| Xmax | etc. |
| Ymax | etc. |
| Descriptor | ASCII string describing polygon |
| DescriptorID | ID of text blob if descriptor is large |

A Region object can also have an optional name, which is assigned by the user at the time the region is created via the system's region drawing UI. Regions provide the basis for defining a posting's broadcast area, for user-defined channels' broadcast areas, and for pinging a desired area of the map. A Region object is capable of determining whether a given point is contained in one of its component polygons, using a standard "is point in polygon" algorithm.

In an embodiment, the system is capable of maintaining a list of named regions that have been created by a user, and of presenting this list when the user composes a posting. The posting region can thus be defined to include one or more of these named regions. Alternatively, by drawing one or more closed polygons on the map, a user can create an unnamed Region object to identify a posting's broadcast area. A Region object can also be created implicitly to represent the current (rectangular) map view, in case the user chooses to post into or ping the region implied by this current view, i.e., without bothering to outline a specific area.

3.8 Managing Dialogs

The system can support dialogs between individuals who have come in contact with each other via the various means provided by the system. Postings, as described above are one way a user comes in contact with another user. Ping topics and pinging provide a second way for one user to come in contact with another. Photos attached to the map provide yet another way for users to contact one another. Regardless of which of these three methods resulted in initial contact, the system gives the "originating" user, i.e., the sender of the posting, the owner of the ping topic, or the owner of the map photo, the option of enabling "receiving" users to respond. In this way a dialog between the users is made possible.

Dialog objects (Table 12) record ongoing message streams between two users.

TABLE 12

| DIALOG TABLE 150 FIELD | DESCRIPTION |
|---|---|
| ID | Unique ID |
| FromUserID | ID of user who initiated dialog |
| ToUserID | ID of other user |
| RefType | How the dialog began, e.g., "posting" |
| Subject | Message title of initiating event |
| CreateDate | Date/time at which the dialog began |
| Flags | Behavioral flags |

Each Dialog object includes a reference to the user who sent the initial message, a reference to the user who is the recipient of this first message, and a reference to the object in the system that enabled the dialog's inception (Posting, Ping Topic, or Map Photo).

As the users' discourse progresses, message objects (Table 13) are accumulated.

TABLE 13

MESSAGE TABLE 190

| FIELD | DESCRIPTION |
| --- | --- |
| ID | Unique ID |
| FromUserID | ID of message's sender |
| ToUserID | ID of recipient user |
| DialogID | ID of dialog of which a part, if any |
| CreateDate | Date/time message was created |
| Subject | Message's subject (title) |
| Body | Message's body |
| BodyID | ID of text blob if body is large |
| PhotoID | ID of photo blob, if any |
| AudioID | ID of audio blob, if any |
| DocID | ID of document blob, if any |
| LinkURL | URL of attacked link, if any |
| Flags | Message's behavioral options |
| Status | Flags (e.g., "new", "viewed") |

Each Message object refers to the parent Dialog object (Table 12). Either of the dialog's users is free to delete any or all of a dialog's messages, as well as the entire dialog, at any time.

In a large system, many servers, identified in the Servers database table as DIALOG servers 221, might play the role of dialog server. Each DIALOG server 221 will manage a subset of the system's overall Dialog and Message objects, allowing the system to scale arbitrarily.

3.9 Managing Users and the Log-on Process

One or more servers, identified as USER servers 215 in the main Servers database table (Table 1), manage a subset of the overall system user population. These servers are typically also the HTTP servers to which the client tier connects when making requests.

Each user is represented by one of the User objects previously described (Table 13).

Each user is further represented by one entry in the User Master Index database table shown below in Table 16. The User Master Index database table is stored on the single server that has been designated as the system's MASTER server 211.

TABLE 16

USER MASTER ENTRY TABLE 300

| FIELD | DESCRIPTION |
| --- | --- |
| LogonName | User's unique log-on name |
| Password | User's log-on password |
| Email | User's email address |
| UserID | User's ID |
| Administrator | Administrative flags |

Each User object uniquely identifies and describes one user of the system. Each entry in the User Master Index table contains the critical information enabling the user to log on (log-on name and password), as well as the user's system-wide unique email address.

When a user attempts to log on to the communications system 200, the client tier 205 passes the log-on name and password that have been entered to the system's MASTER server 211, which is also an HTTP server. The MASTER server 211 validates the information, and upon success, redirects the client tier to the USER server 215 that hosts the user, who has now been identified.

User Event objects, represented in Table 17, are created by various user actions that consume system resources, e.g., postings, pings, roaming check-ins, etc.

TABLE 17

USER EVENT TABLE 290

| FIELD | DESCRIPTION |
| --- | --- |
| UserID | ID of relevant user |
| EventType | Type of user event, e.g., "logon", "ping" |
| EventDate | Date/time of the event |
| EventData | Ancillary information about the event |

Using the information contained in the UserEvent objects, the communications system 200 can perform checks that ensure that usage limits do not exceed the limits associated with the user's subscription package. Likewise, Account Action objects (Table 18) track user account activities, such as payments received when a user obtains a more advanced subscription package.

TABLE 18

ACCOUNT ACTION TABLE 100

| FIELD | DESCRIPTION |
| --- | --- |
| ID | Unique ID |
| UserID | ID of relevant user |
| ActionDate | Date/time of the action |
| ActionType | e.g., "subscription upgrade" |
| ActionStatus | Flags indicating action's status |
| ActionChargeCents | Charge to user, if any |
| ActionComments | Action comments, if any |

Problem objects (Table 19) record user problems, requests, etc., and serve as the system's foundation for on-line customer service.

TABLE 19

PROBLEM TABLE 230

| FIELD | DESCRIPTION |
| --- | --- |
| ID | Unique ID |
| UserID | ID of relevant user |
| ProblemDate | Date/time when problem was logged |
| ProblemCode | Internal code indicating problem type |
| ProblemTopic | Subject supplied by user, if any |
| ProblemDesc | Description supplied by user, if any |
| ResolvedBy | ID of administrative user who solved |
| ResolutionDate | Date/time problem was solved |
| ResolutionCode | Internal code indicating how solved |
| ResolutionDesc | Administrative comments, if any |

Referral objects (Table 20) are created when a user opts to refer the system to a friend who is not yet a member of the system. This process also generates an automatic email to the prospective user.

TABLE 20

REFERRAL TABLE 250

| FIELD | DESCRIPTION |
| --- | --- |
| ID | Unique ID |
| ReferringUserID | ID of user making the referral |
| ReferralDate | Date/time of the referral |
| X | Proposed antenna longitude |
| Y | Proposed antenna latitude |
| NewUserEmail | Email address of referred individual |
| EntryKey | Speed key for referred user to see map |
| Subject | Referral message's subject |
| Message | Referral message's body |

TABLE 20-continued

REFERRAL TABLE 250
| FIELD | DESCRIPTION |
| --- | --- |
| EmailSent | Internal flag (referral email yet sent) |
| NewUserID | ID of referred user if signs up |

HomePage objects (Table 21) and associated Blob objects (Table 22) are created when a user submits a home page to be internally hosted by the system. Blob objects are also created when photos, audio clips, and other ancillary files first enter the system.

TABLE 21

HOME PAGE TABLE 170
| FIELD | DESCRIPTION |
| --- | --- |
| ID | Unique ID |
| Path | Storage path of home page materials |
| InitialPageName | HTML file name of initial page |
| CreateDate | Date/time home pages were checked in |

TABLE 22

BLOB TABLE 120
| FIELD | DESCRIPTION |
| --- | --- |
| ID | Unique ID |
| Name | Name, if relevant (e.g., photo title) |
| FileRole | Type of object the blob represents |
| FileType | Physical file format, e.g., JPEG, WAV |
| Path | Physical storage path of the file |
| CreateDate | Date/time blob was created |

3.9.1 User Account Types

In an embodiment, communications system 200 classifies users by account types, which are defined by subscription packages. Each account type grants or denies access to various system features and resources, defines usage level limits. For example, the ability to define user channels is granted only to users of a particular account type or higher. Visible home antennas are available only with certain account types. Posting region size and distance, and ping regions and weekly ping hit counts are examples of system usage limits that are imposed by the various account types. A UIs permits a user to upgrade to a more advanced subscription package, and hence account type, on request.

3.9.2 User Account Information

In an embodiment, users of the communications system 200 can request information about their current registration. Referring to FIG. 6, in response to such a request, an account information UI screen 601 is presented.

Field 603 indicates the current e-mail address that the user has registered with the communications system 200.

Field 605 indicates the current mailing and or residential address of the user.

Field 607 indicates the current location of a base antenna assigned to the user. The base antenna's location is represented in latitude and longitude directional coordinates.

If the user has additional antennas, then the name and coordinates of these antennas would be displayed in field 609.

Field 611 is used to list the names of regions that the user has defined.

Field 613 is used to summarize a user's notification filters. Here, for example, a user has three notification filters associated with the antennas "Home", "My Office", and "Bill's Office". Each of these antennas are tuned to receive postings on the categories indicated in the "Post Category" column. In the event the boundaries of one region over lap with the boundaries of another, then the regions are identified in column entitled "Overlaps with" and the degree of overlap is indicated in the column labeled "by %". Finally, the users desire to receive e-mail notification of any postings satisfying the notification filters is indicated by selection of the corresponding boxes in the column labeled "Send as Email".

4.0 Representing Postings

In an embodiment, each posting is represented within communications system 200 as a Posting Object, illustrated below in Table 23. Each posting object is comprised of a linkable URL displaying the posting message's subject and message body.

TABLE 23

POSTING TABLE 220
| FIELD | DESCRIPTION |
| --- | --- |
| ID | Unique ID |
| UserID | ID of user who created the posting |
| ChannelID | Channel on which posting was sent |
| MessageID | ID if relevant message object |
| RegionID | ID of posting region, if relevant |
| Status | e.g., "sent", "pending" |
| CreateDate | Date/time of the posting |
| ExpireDate | Expiration date of the posting |
| ProxyID | ID of posting proxy server |
| HitCount | Count of antennas initially hit |
| MobileHitCount | Count of antennas hit by roam check-ins |

4.1 Representing Posting Proxies

In an embodiment where processing is distributed among multiple servers, for example USER servers 215 and ROAM servers 219, a Posting Proxy object is created. An exemplary Posting Proxy object is illustrated below with respect to Table 24. The PostingProxy object, stored on ROAM servers 219, is a surrogate for the Posting object (Table 23) which would be stored on the USER server 215.

TABLE 24

POSTING PROXY TABLE 230
| FIELD | DESCRIPTION |
| --- | --- |
| ID | Unique ID |
| PostingID | ID of relevant posting |
| CreateDate | Date/time posting was sent |
| ChannelID | ID of channel on which posting was sent |
| RegionID | ID of posting region |
| Xmin | Posting region's bounding rectangle |
| Ymin | etc. |
| Xmax | etc. |
| Ymax | etc. |

4.3 Representing Receptions

In an embodiment, Reception objects, depicted in Table 25, are created to denote reception of an event for an antenna (e.g., receipt of a message).

TABLE 25

RECEPTION TABLE 240
| FIELD | DESCRIPTION |
| --- | --- |
| ID | Unique ID |
| AntennaID | ID of antenna on which received |
| ChannelID | ID of channel on which received |

TABLE 25-continued

| RECEPTION TABLE 240 FIELD | DESCRIPTION |
| --- | --- |
| PostingID | ID of posting received |
| ReceptionDate | Date/time of the reception |
| Status | Internal status flag ("new", "viewed") |
| EmailStatus | Email flags, if forwarding requested |

5.0 Exemplary System Usage 5.1 The Posting Process

Figure 7A:
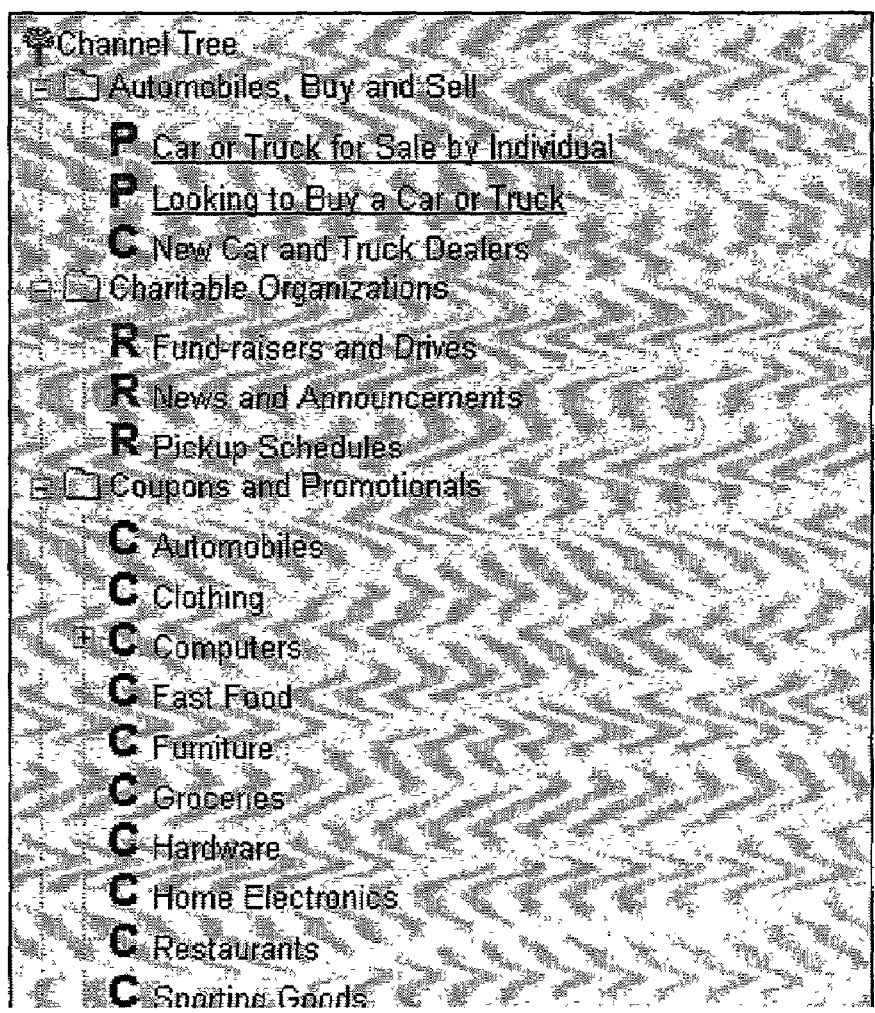
Figure 7C:
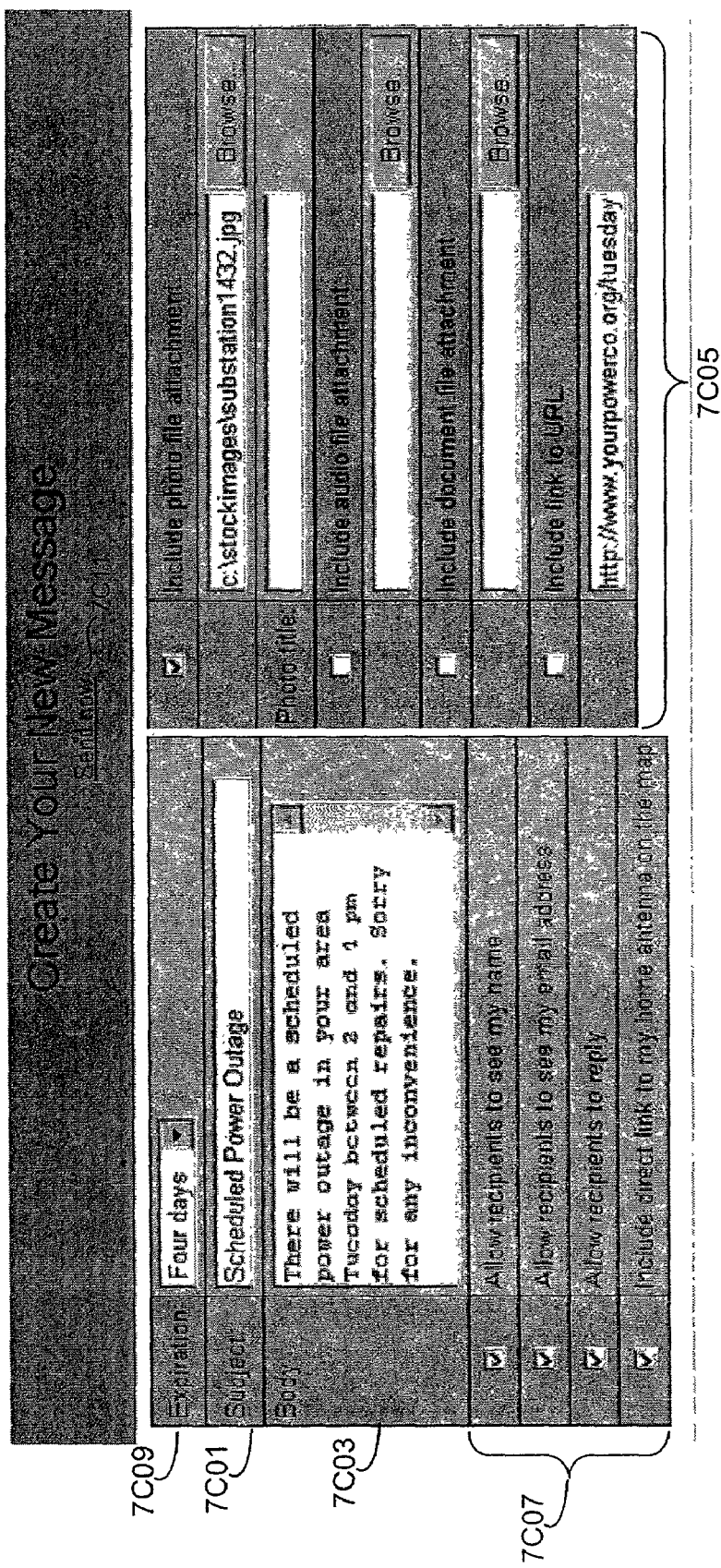

Postings provide one way for a user to initiate a contact with other users of communications system 200. An exemplary message posting shall now be described with reference to FIGS. 7A, 7B, 7C, and 7D. Referring to FIG. 7A and 7B, in an embodiment, communication system 200 prompts a user for the following information when the user elects to send a new posting: (1) the broadcast channel, (2) the broadcast region, (3) the message contents, and (4) several behavioral options.

Figure 7D:
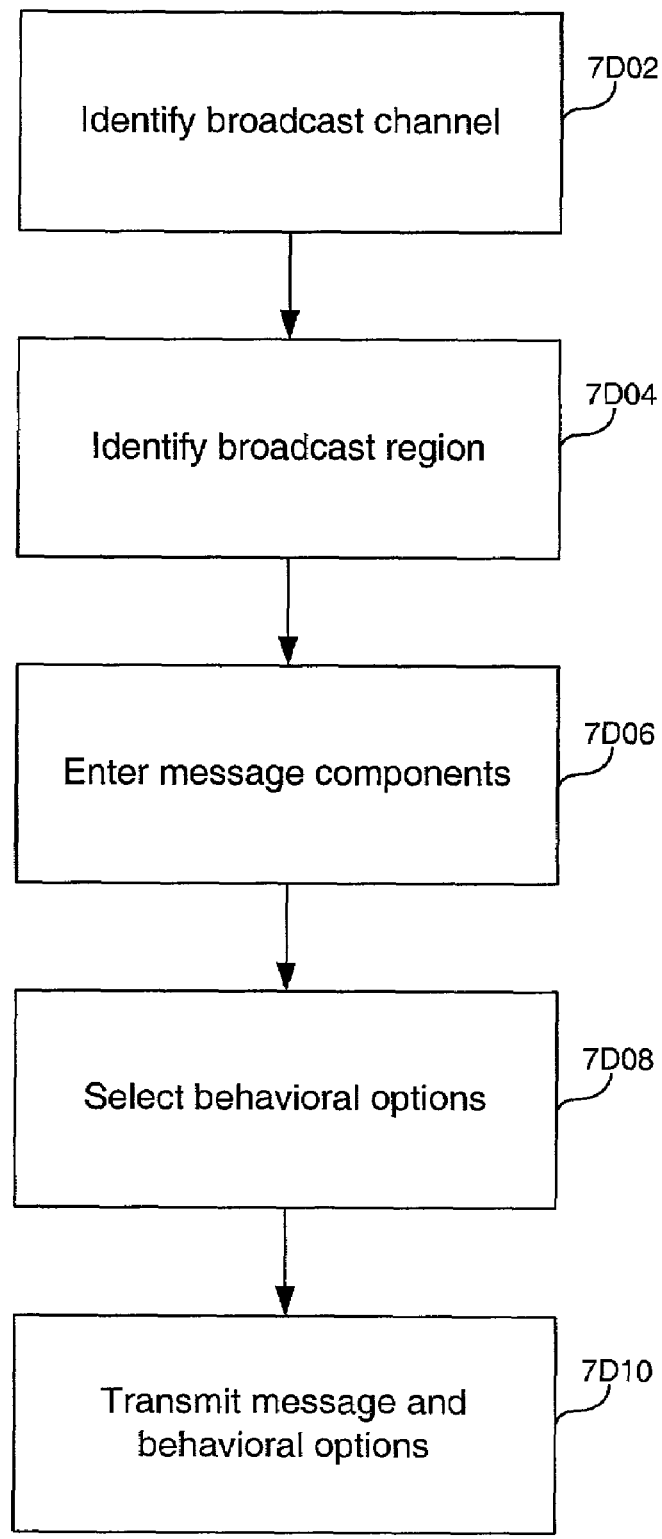
FIG. 7D is a flow chart diagram of a message posting routine according to an embodiment of the present invention.

Accordingly, as shown in step 7D02 of FIG. 7D, the user identifies a broadcast channel in the user input box 7A13. In an embodiment, the broadcast channel identified has a channel description related to the subject of the message.

Next, in step 7D04, the user identifies a broadcast region descriptor associated with the identified broadcast channel. This entry is made into user input box 7B15. In an embodiment, the broadcast region descriptor is comprised of one or more geographical regions into which the message is to be communicated. In an alternative embodiment, the identified broadcast channel is not a user channel with a predefined broadcast region descriptor. In this case, the broadcast region descriptor is defined in real time as depicted in user input box 7B17.

Next, in step 7D06, the user enters the message to be communicated using for example, user input box 7C03. In an embodiment, the message can be composed of one or more message components such as text data, image data, audio data, or linking data for accessing a page on the Internet. In accordance with this embodiment, the attachment of additional message components can be identified in user input boxes 7C05.

Next, in step 7D08, the user selects one or more behavioral options via input boxes 7C07. Exemplary behavioral options include whether to reveal a name associated with the user (i.e., originator of the message to the target user community), whether to reveal an electronic mail address associated with the user, and whether to allow the target community to communicate a reply to the user. The behavioral options might also include a link to a universal resource locator for directing the user to a specific web site on the world wide web.

Finally, in step 7D10, the user causes the message to be transmitted by, for example, selecting an input prompt such as the user input icon 7C11. In response, the message and said behavioral options are transmitted for further processing and communication to the target user community.

The broadcast region comprises one or more Region objects (Table 11), each of which comprises a set of one or more closed polygons on the map. The message contents comprise a subject (shown in 7C01), a body (shown in 7C03), and one or more optional attachments identified in 7C05 (e.g., a photo, an audio clip, a document, or a URL link). Behavioral options 7C07 include such preferences as whether or not others should see the sender's identity, whether or not the sender wants to enable replies to the posting, and so forth. All postings also have a lifetime indicator 7C09, which can be controlled within system-defined limits, e.g., from one day to one month. An ongoing background thread automatically deletes all postings whose lifetime has expired.

Figure 8:
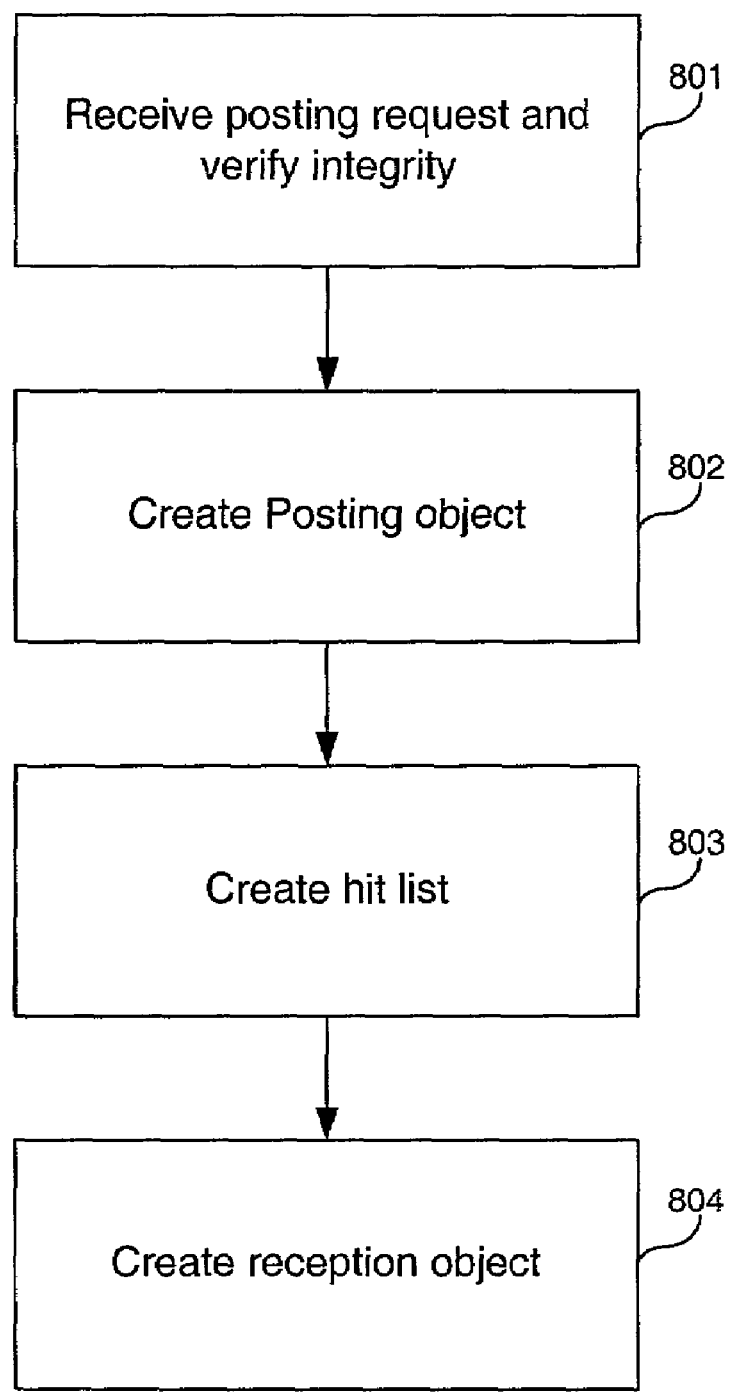
FIG. 8 is a flow chart diagram of a message posting routine according to an embodiment of the present invention.

Referring to FIG. 8, in an embodiment, upon collecting the information relevant to a posting (FIGS. 7A–7D), in step 801, the communications system's 200 client tier 205 sends the posting request to the server tier 211, which verifies its integrity.

In step 802, a new Posting object (FIG. 10, 220) is created. The new Posting object binds all relevant information together as one new row in the Postings database table. Supporting objects are also created in other database tables as part of this process. For example, a new Message object (Table 13) is created to represent the message contents, and this object might in turn have supporting Blob objects (Table 22) that represent the message's optional attachments. At this point, the posting exists in both runtime and persistent storage form, and must be "broadcast" so that antennas within its broadcast region that are tuned to the posting's channel will receive the posting.

Next, in step 803, potentially relevant antennas are located by an approximate search on the system's Antennas database table (Table 2) and a hit list is created. The goal of this step is to identify all the antennas within the targeted user community that should be notified of the message posting. Since in a production environment, the Antennas database table might be distributed among many "antenna servers", the search might actually be initiated in parallel on many such servers, which are identified as such via Server objects stored in the system's main Servers table (Table 1).

For each Region object (Table 11) in the posting's broadcast region, that Region object's geographical extents, (xmin, ymin, xmax, ymax), are retrieved. The search on the Antennas table(s) first locates all antennas that fall within the Region's geographical extents, and that have been enabled to receive postings on the posting's channel. These antennas are referred to as candidate antennas. All of the antennas within the Region's geographical extent will not necessarily be within the broadcast region. For example, a Region object's geographical extents might cause it to partially overlap the broadcast region as opposed to being fully within it. In this case, it is necessary to separate from all the antennas that fall within the Regions geographical extents, those antennas that are actually within the broadcast region. Accordingly, for each candidate antenna, using a standard "is point in polygon" algorithm, a specific check is made to determine whether the antenna actually lies within the broadcast region. The subset of all antennas that pass these tests comprise the posting's "hit set".

Finally, in step 804, for each antenna in the hit set, a Reception object (Table 25) is created to denote the reception event for that antenna. Specifically, the new Reception object logically binds the Posting object (Table 23), the Channel object (Table 5), and the Antenna object (Table 2) together, and notes the date and time of the reception. In a preferred embodiment, the posting's Message object is not actually replicated, as it would be in an email system, but rather simply referred to by the Reception object. There are four benefits to this approach: First, it significantly reduces compute time and storage requirements, since only one copy of the posting exists for the (potentially thousands of) Reception objects that refer to it. Second, the posting's user can delete ("recall") the posting instantly from all prospective recipients, a feature thought to be important in an open, public system such as this. Third, the act of deleting a received posting is simplified, since only the Reception object needs to be deleted. Fourth, since all Posting objects will eventually be deleted either by their sender or by the system thread that looks for expired postings, eventually all traces of each posting will eventually be removed from the system, avoiding a buildup of copies of the posting.

The act of creating a Reception object can also result in a standard email message being sent to the antenna's owner. This case will occur when the user has indicated that messages received on the Reception object's channel are of enough potential interest that they should be forwarded to the user's normal email account, in addition to being recorded inside of the system. For receptions on channels marked for email forwarding, the system composes a summary of the new reception, then sends it to the user's normal email account via an SMTP mail host.

5.2 The Ping Process

The system permits users to "ping the map" by outlining a region on the map UI and entering ping keywords, also optionally interconnected with logical operators, then requesting a "ping". Upon receiving such a request, the system is capable of finding any antennas within the outlined region that have at least one antenna topic determined to match the supplied ping keywords. Upon finding all such matches from various antennas in the outlined region, the system is capable of returning the list of ping hits. Each ping hit shows the ping topic's message, possibly along with other optional information about the ping topic's owner.

An exemplary method to "ping the map" will now be described with reference to FIG. 9 and FIG. 10.

Figure 9:
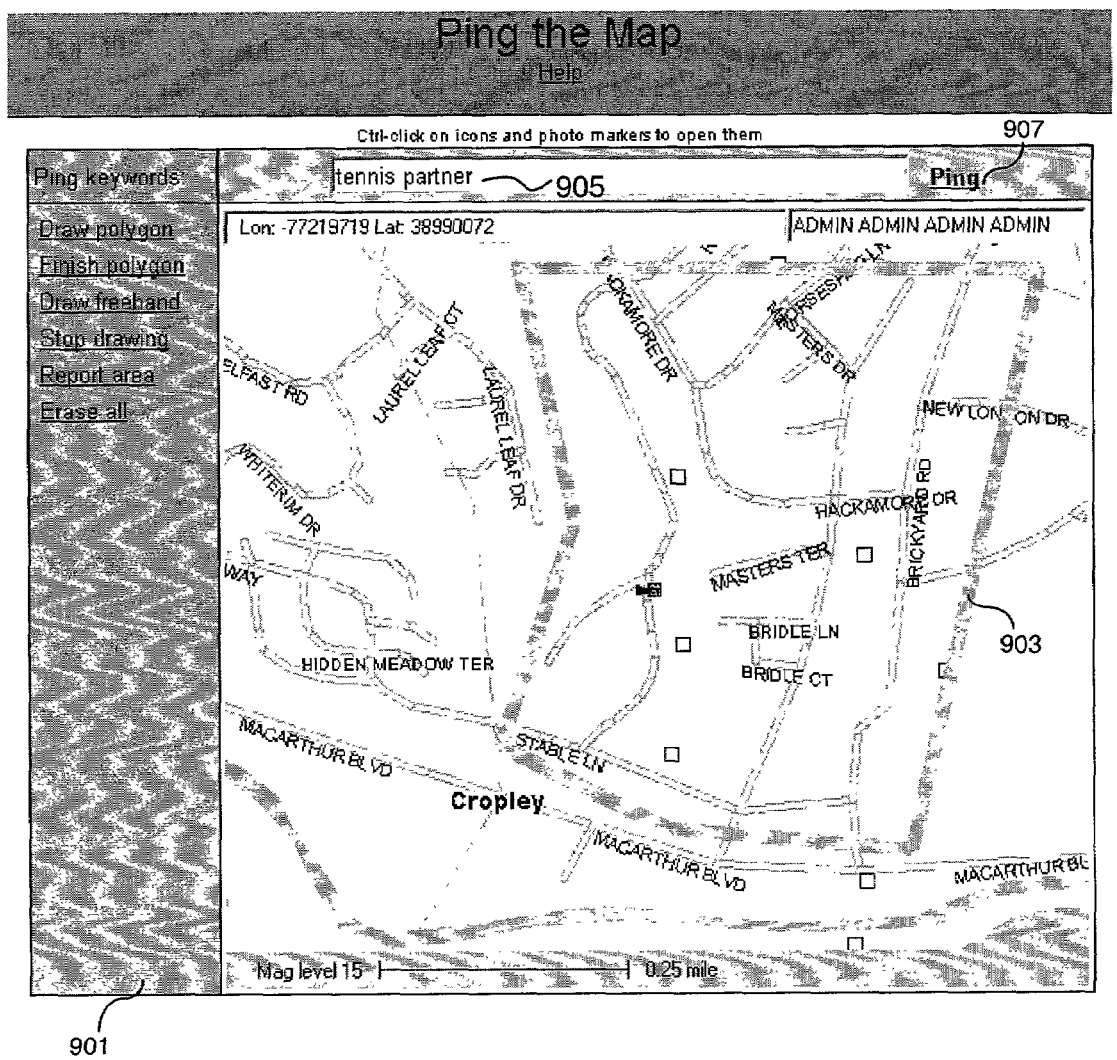
FIG. 9 is an illustration depicting a ping entry user interface screen in accordance with an embodiment of the present invention.

Referring to FIG. 9, a user first identifies a map region 903 using the system's ping UI 901. In an embodiment, the map region 903 is identified by drawing a closed polygon that is internally represented by a ping Region object (Table 11).

Next, a keyword expression 905 is entered.

Finally, the ping request is submitted by clicking the ping request 907.

Figure 10:
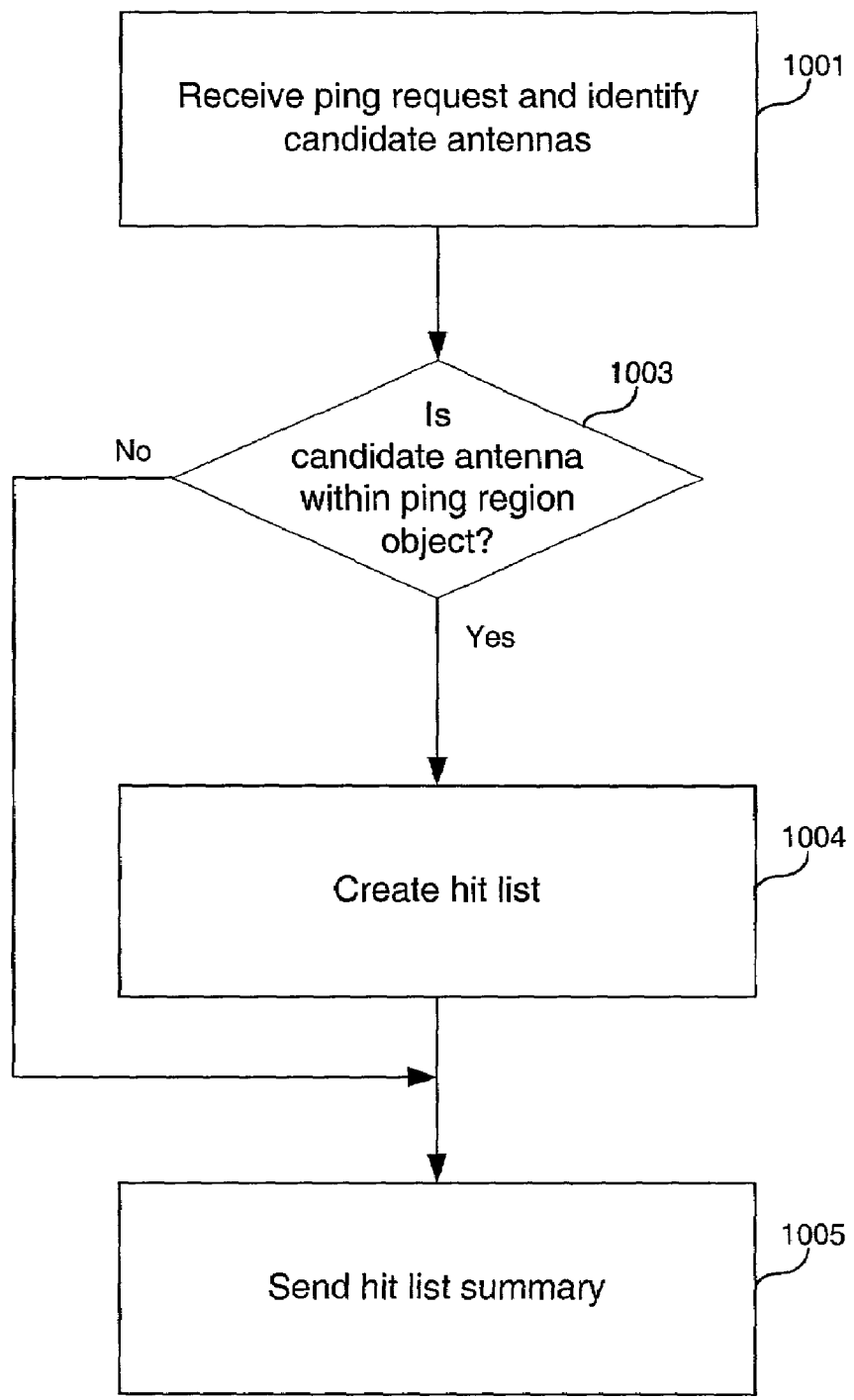
FIG. 10 is a flow chart diagram of a ping execution routine according to an embodiment of the present invention.

Referring to FIG. 10, in a first step 1001, upon receiving the ping request from the client tier 205, the communications system's server tier 215 finds candidate antennas in the selected map region 903 using an algorithm similar to that described for locating initial candidate antennas to receive a posting.

Next, in step 1003, for each candidate, a specific check is made to determine whether the candidate antenna actually is contained by the ping region object.

In step 1004, for each candidate antenna contained by the ping region object, an appropriate pattern-matching algorithm is applied to determine whether or not the ping keyword expression matches the keyword expression of any of the antenna's Ping Topic objects. Each Ping Topic object (Table 6) thus found to match is added to the ping's "hit list".

Finally, in step 1005, the user server 215 sends a summary of the results back to the client tier 205, representing each hit by the ping topic's title, message, and any links enabled by the ping topic's behavioral options. For example, if the ping topic enables responses, then the hit will have an associated "Reply" option; if the ping topic enables users to zoom to the ping topic's (visible) antenna, then the hit will have an associated "Show home" link, and so forth.

In a large system embodiment, a ping request will be routed to many ANTENNA servers 217 in the middle tier. Each such server 217 hosts a subset of the overall population of Antenna objects, and is capable of performing the algorithms described in order to obtain a hit list. The union of all such lists from all ANTENNA servers 217 is then returned to the client tier 205. System parameters can be set to limit the number of ping responses from each server, to keep hit set sizes within reasonable limits.

5.3 The Roam Check-in Process

Figure 11:
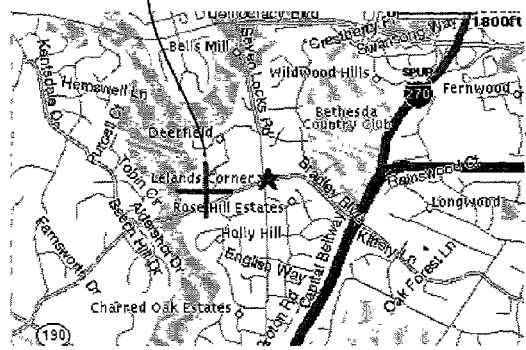
FIG. 11 is an illustration depicting a browsing entry user interface screen in accordance with an embodiment of the present invention.

Referring to FIG. 11, the communications system 200 also provides a UI 1101 that permits a user interactively to move a mobile antenna 1103 around the map 1105, simulating the movement of the mobile antenna 1103 as though it were in an actual vehicle. Each repositioning of the mobile antenna 1103 causes a check-in event, in which the system looks for postings relevant to the mobile antenna's new location and not yet received by the antenna. This feature permits a user to "roam the map", from UI 1101 instead of an actual vehicle, thereby discovering postings at places of interest around the map. As with "stationary" antennas, a mobile antenna 1103 will receive only those system channels to which it has been tuned, and only those user channels whose parent system channel has been tuned in.

A roaming check-in occurs from the client tier when a mobile antenna 1103 identifies itself and its location to the server tier 215. Such a check-in can occur either from a truly mobile antenna, where the client tier 205 is running in a mobile, GPS-enabled PC, or from the previously described manual roaming UI 1101, from which a stationary user can simulate the movements of a mobile antenna 1103. The goal of the roaming check-in is to find any postings that hit the mobile antenna 1103 in its current location, and which have not already been received by the mobile antenna 1103.

Figure 12:
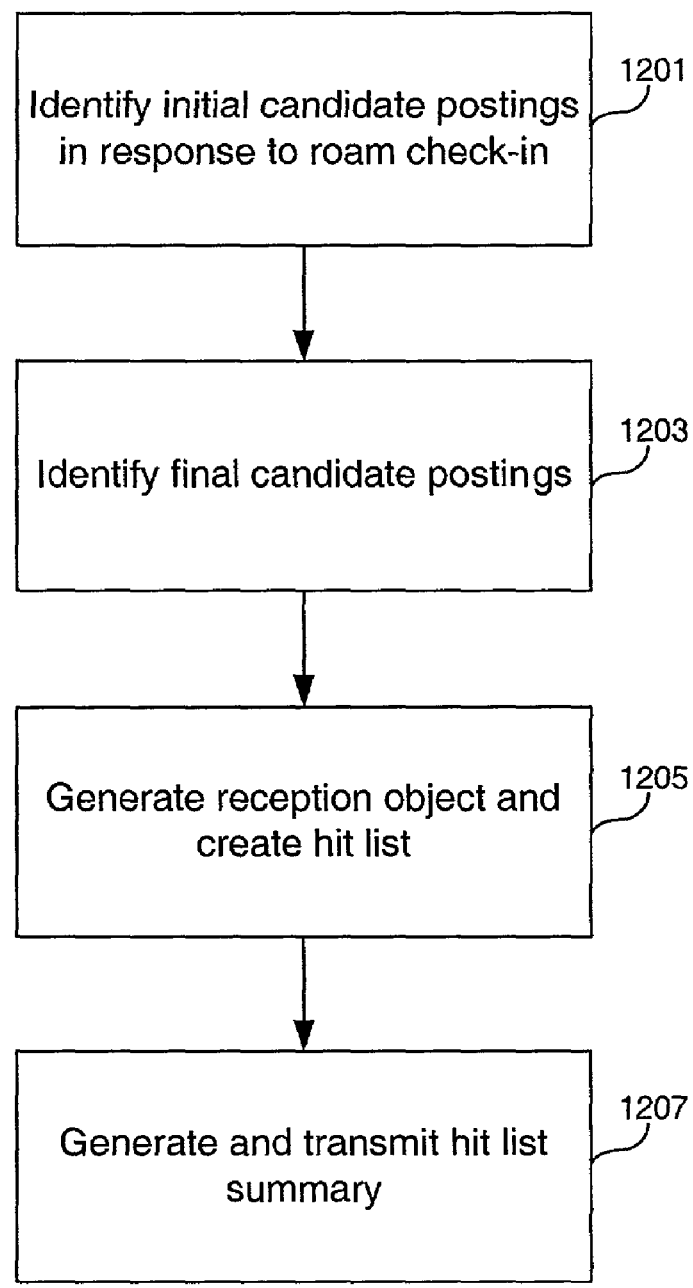
FIG. 12 is a flow chart diagram of a browsing execution routine according to an embodiment of the present invention.

FIG. 12 provides an exemplary method for executing a roaming check in accordance with an embodiment of the present invention.

In step 1201, upon receiving a roaming check-in, the server tier 215 first finds a set of initial candidate postings whose broadcast region's extents (xmin,ymin,xmax,ymax) contain the mobile antenna 1103, and whose channel (or its parent channel in the case of user channels) has been tuned in for the antenna.

In step 1203, for each initial candidate, it is determined whether or not the antenna's location is actually contained by one of the broadcast Region objects. Each posting found to contain the antenna's current point becomes a final candidate.

Then, in step 1205, for each final candidate posting for which a Reception object does not already exist for this mobile antenna 1103, the server 215 generates a new Reception object and adds the posting to a hit list.

Finally, in step 1207, the server tier 215 returns a summary of the hit list to the client tier 205, with each Posting object represented by a linkable URL displaying the posting message's subject and message body. The user can then retrieve and view any posting on the hit list by clicking on its link.

As with ping processing, in a large system embodiment, a roaming check-in request will typically be routed to many servers identified as ROAM servers 219 in the Servers database table, each of which hosts a subset of the overall population of Posting Proxy objects (Table 24).

A Posting Proxy object is a surrogate for an actual posting, which itself will typically be stored on the USER server 215 that hosts the user who sent it. PostingProxy objects stored on ROAM servers 219 allow the computationally intensive work of roaming check-ins to be distributed across any number of servers, each of which performs the algorithms described and returns a hit list. In accordance with this embodiment, the union of all such lists would be returned to the client tier 205 as the response to the roaming check-in (step 1207). As with ping processing, system parameters can limit the number of postings from each roam check-in server to keep hit set sizes within reasonable limits.

5.4 The Dialog Process

Figure 13:
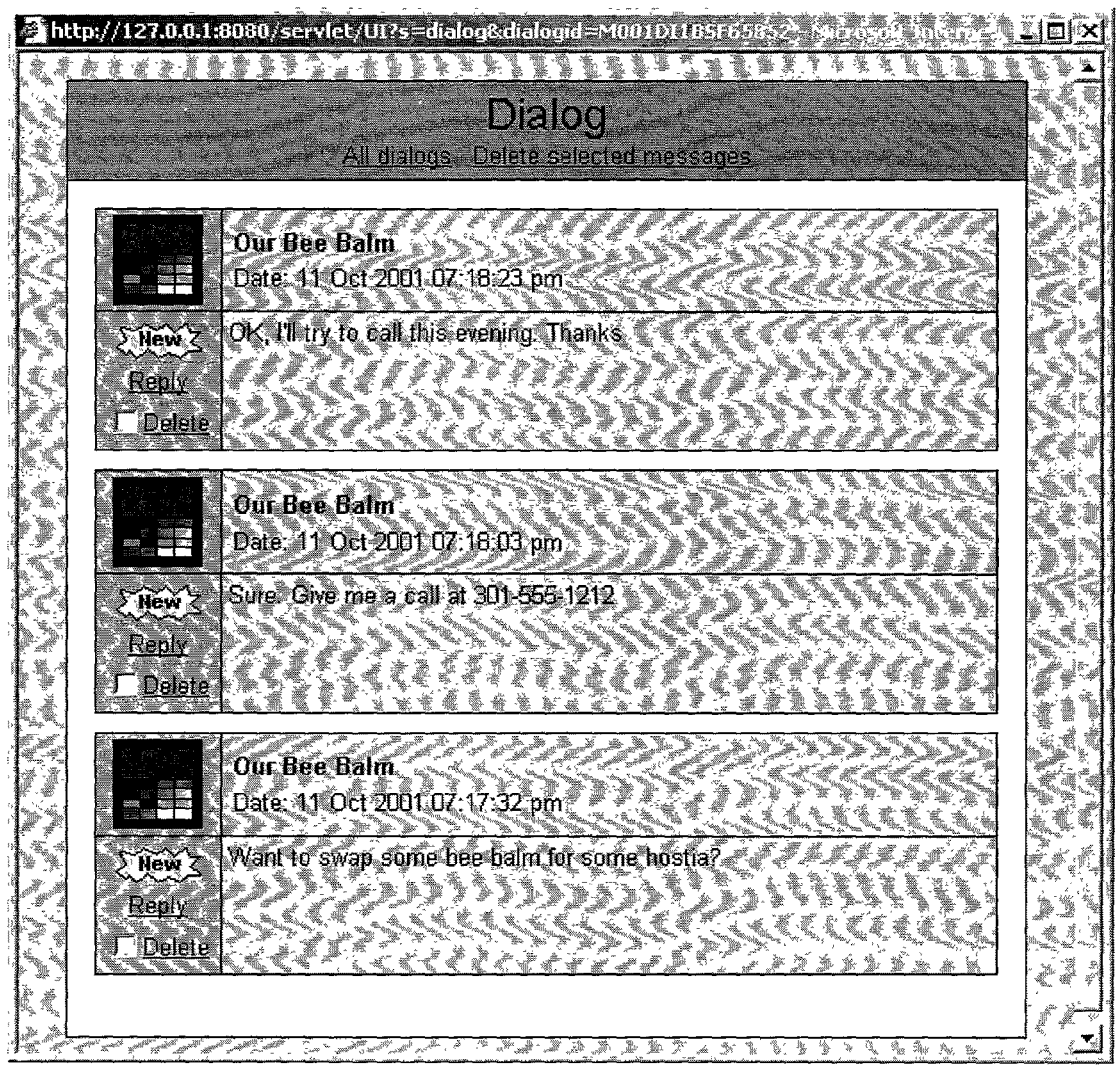
FIG. 13 is an illustration depicting a dialog between two users according to an embodiment of the present invention.

A response to one of the described initial contact events (i.e., ping, post, and photos/icons) starts a dialog between the receiving user and the originating user. From that point on, both parties will be able to see the dialog in the system's dialog UI, an exemplary illustration of which is provided in FIG. 13. Also, once the dialog exists, both parties can add new messages to it, providing a two-way communication mechanism between the parties, even though either or both may choose to remain anonymous. Messages sent as part of the dialog can include attachments such as photos, audio clips, and external documents. Dialogs are terminated, i.e., removed from the system, either explicitly by one or both parties, or by other system rules based on such parameters as age or disuse.

6.0 Conclusion

While various embodiments of the present invention have been described above, it should be understood that they have been presented by way of example only and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of communicating postings to a target user community, comprising:
    (a) storing a plurality of postings, each posting including a source identification tag, an information body, and a broadcast descriptor, the broadcast descriptor identifying a geographical region of said each posting, wherein the geographical region is defined by a closed region on a map;
    (b) receiving a plurality of requests from mobile and stationary users, each request from a user including a user identification tag and an antenna descriptor, the antenna descriptor identifying a geographical location of the user;
    (c) processing said each request, including:
        (1) identifying one or more postings having geographical regions that contain the geographical location, and
        (2) sending the identified one or more postings to the user;
    (d) processing a subsequent request from the user, the subsequent request including a user identification tag and an antenna descriptor specifying a subsequent geographical location of the user, said processing a subsequent request from the user including:
        (1) sending to the user other postings having geographical regions that contain the subsequent geographical location, wherein the other postings do not include any posting previously sent to the user.

2. The method of claim 1, further comprising:
    (e) storing and managing a plurality of user accounts corresponding to the stationary and mobile users, each user account including at least one user identification tag and corresponding antenna descriptor.

3. The method of claim 2, wherein step (c)(2) comprises: sending postings via email to users associated with the plurality of user accounts.

4. The method of claim 2, further comprising:
    (f) accepting definitions of the postings and the plurality user accounts via a graphical user interface;
    (g) removing definitions of the postings and the plurality user accounts via the graphical user interface; and
    (h) displaying the postings and information related to the plurality of user accounts via the graphical user interface.

5. The method of claim 2, further comprising:
    (f) maintaining a transient user account for a transient user that does not have a user account in the plurality of user accounts, the transient user account including at least one user identification tag and corresponding antenna descriptor, and serving as a temporary user account until timed out and garbage collected after a predefined period of inactivity of the transient user.

6. The method of claim 1, wherein the geographical region is a closed region defined on a map by latitude and longitude.

7. The method of claim 6, wherein the geographical region is further defined by vertical distance from sea level.

8. The method of claim 1, wherein step (b) comprises: receiving at least one request from a user over a wide-area network.

9. The method of claim 1, wherein step (b) comprises: receiving at least one request from a user over the Internet.

10. The method of claim 1, wherein step (b) comprises: enabling the mobile and stationary users to provide requests via standard Web browsers.

11. The method of claim 4, wherein step (h) comprises:
    displaying geographical maps with the graphical user interface to depict at least one of a broadcast descriptor and an antenna descriptor; and
    enabling the mobile and the stationary users to use the graphical user interface to draw on the geographical maps with interactive drawing tools to define the at least one of a broadcast descriptor and an antenna descriptor.

12. The method of claim 2, wherein the user accounts have associated user preferences, the user preferences including logical filters, wherein step (e) comprises:
    specifying further characteristics of the postings with the logical filters that must be present for the postings to be sent to the corresponding user.

13. The method of claim 5, wherein step (c)(2) comprises:
    using the antenna descriptors of the transient user accounts to find and send postings to a mobile transient user based on global positioning system (GPS) coordinate data from a mobile communications device of the mobile transient user.

14. The method of claim 1, further comprising:
    (e) maintaining a record for a particular user of which the postings having geographical regions that contain the geographical location of the particular user, wherein the record does not maintain duplicates of the postings having geographical regions that contain the geographical location of the particular user.

15. The method of claim 1, further comprising:
    requiring a password associated with a posting to be used by any user requesting to view the information body of the posting.

16. The method of claim 1, wherein said each posting includes an optional activation time period, the activation time period including a start time and a stop time, further comprising:

(e) governing the duration of an availability a respective posting to users using the start time and the stop time.

17. The method of claim 1, further comprising:
(e) recording user transaction data, the user transaction data including information related to a duration of contact with a respective user, and a record of actions performed within the duration by the respective user.

18. The method of claim 2, further comprising:
(f) storing the postings having geographical regions that contain the geographical location of a particular user in a user account of the particular user; and
(g) permitting the particular user to define criteria to determine when postings stored in a user account of the particular user are to generate email to the particular user.

19. The method of claim 2, further comprising:
(f) restricting the posting authority of any user account by accepting and storing a plurality of authorized region descriptors and unauthorized region descriptors, any authorized region descriptor optionally having at least one of an associated posting password and posting category restriction list; and
(g) requiring at least one of the posting password and the category restriction list to be respected by any posting having geographical regions that contain the geographical location of a particular user in a user account of the particular user before storing the posting.

20. A system for communicating information to a target user community using geographical maps, comprising:
a posting information database for storing one or more postings, each posting including a source identification tag, an information body, and a broadcast descriptor, the broadcast descriptor identifying a geographical region of said each posting, wherein the geographical region is defined by a closed region on a map; and
a postings manager in communications with said posting information database, wherein the postings manager is configured to receive a plurality of requests from mobile and stationary users, each request from a user including a user identification tag and an antenna descriptor, the antenna descriptor identifying a geographical location of the user;
an intersection engine configured to process said each request to identify one or more stored postings having geographical regions that contain the geographical location; and
a notifications manager that sends the identified one or more postings to the user;
wherein the intersection engine is configured to process a subsequent request from the user received by the postings manager, the subsequent request including a user identification tag and an antenna descriptor specifying a subsequent geographical location of the user; and
wherein the notifications manager is configured to send to the user other postings identified by the intersection engine having geographical regions that contain the subsequent geographical location, wherein the other postings do not include any posting previously sent to the user.

21. The system of claim 20, further comprising a map manager for generating geographical map views covering the target user community.

22. The system of claim 21, further comprising a user interface for accepting a personal icon to be associated with a user account.

23. The system of claim 22, wherein said personal icon is a visible element in said postings.

24. The system of claim 23, further comprising a virtual antenna.

25. The system of claim 24, wherein said postings manager is configured to display a visible graphical element representing said virtual antenna on said geographical map views.

26. The system of claim 25, wherein a user is permitted to activate said visible graphical element thereby causing a user-defined URL to be opened and displayed.

27. The system of claim 24, further comprised of a plurality of ping topics associated with said virtual antenna, each said ping topic comprising a ping topic keyword pattern and a ping topic response.

28. The system of claim 20, wherein said postings manager is configured to accept a photo attachment, said photo attachment comprising (1) a digital photograph, (2) descriptive information about said digital photograph, and (3) behavioral preferences associated with said digital photograph.

29. The system of claim 28, wherein said photo attachment is associated with an attachment point, said attachment point being a point on said geographical map views.

30. The system of claim 20, wherein said postings manager is further configured to enable a plurality of user dialogs, each said user dialogs comprising a plurality of messages between a source user and a recipient user.

31. The system of claim 20, further comprising a channel tree comprising a plurality of named system channels inter-related hierarchically.

32. The system of claim 31, further comprising a plurality of user channels, each of said user channels being owned by said user and comprising (1) a name, (2) a parent system channel, said parent system channel being one of said plurality of named system channels, and (3) a region descriptor.

33. The system of claim 20, further comprising a mobile antenna.

34. The system of claim 20, further comprising an account manager for assigning each user an account type, said account type comprising a system feature table and a usage limits table.

35. A computer program product having a computer readable medium having computer codes stored therein, said computer codes executed by a processor to communicate postings to a target user community, said computer codes comprising: code for enabling a processor to store a plurality of postings, each posting including a source identification tag, an information body, and a broadcast descriptor, the broadcast descriptor identifying a geographical region of said each posting, wherein the geographical region is defined by a closed region on a map; code for enabling a processor to receive a plurality of requests from mobile and stationary users, each request from a user including a user identification tag and an antenna descriptor, the antenna descriptor identifying a geographical location of the user; code for enabling a processor to process said each request, including: code for enabling a processor to identify one or more postings having geographical regions that contain the geographical location, and code for enabling a processor to send the identified one or more postings to the user; code for enabling a processor to process a subsequent request from the user, the subsequent request including a user identification tag and an antenna descriptor specifying a subsequent geographical location of the user, said code for enabling a processor to process a subsequent request from the user including: code for enabling a processor to send to the user other postings having geographical regions that contain the subsequent geographical location, wherein the other postings do not include any posting previously sent to the user.

36. The computer program product of claim 35, further comprising:
  code for enabling a processor to store and manage a plurality of user accounts corresponding to the stationary and mobile users, each user account including at least one user identification tag and corresponding antenna descriptor.

37. The computer program product of claim 36, wherein said code for enabling a processor to send the identified one or more postings to the user comprises:
  code for enabling a processor to send postings via email to users associated with the plurality of user accounts.

38. The computer program product of claim 35, further comprising:
  code for enabling a processor to accept definitions of the postings and the plurality user accounts via a graphical user interface;
  code for enabling a processor to remove definitions of the postings and the plurality user accounts via the graphical user interface; and
  code for enabling a processor to display the postings and information related to the plurality of user accounts via the graphical user interface.

39. The computer program product of claim 35, further comprising:
  code for enabling a processor to maintain a transient user account for a transient user that does not have a user account in the plurality of user accounts, the transient user account including at least one user identification tag and corresponding antenna descriptor, and serving as a temporary user account until timed out and garbage collected after a predefined period of inactivity of the transient user.

40. The computer program product of claim 35, wherein the geographical region is a closed region defined on a map by latitude and longitude.

41. The computer program product of claim 40, wherein the geographical region is further defined by vertical distance from sea level.

42. The computer program product of claim 35, wherein the code for enabling a processor to receive a plurality of requests from mobile and stationary users comprises:
  code for enabling a processor to enable the mobile and stationary users to provide requests via standard Web browsers.

43. The computer program product of claim 38, wherein the code for enabling a processor to display the postings and information related to the plurality of user accounts via the graphical user interface comprises:
  code for enabling a processor to display geographical maps with the graphical user interface to depict at least one of a broadcast descriptor and an antenna descriptor; and
  code for enabling a processor to enable the mobile and the stationary users to use the graphical user interface to draw on the geographical maps with interactive drawing tools to define the at least one of a broadcast descriptor and an antenna descriptor.

44. The computer program product of claim 36, wherein the user accounts have associated user preferences, the user preferences including logical filters, wherein the code for enabling a processor to store and manage a plurality of user accounts corresponding to the stationary and mobile users comprises:
  code for enabling a processor to specify further characteristics of the postings with the logical filters that must be present for the postings to be sent to the corresponding user.

45. The computer program product of claim 39, wherein the code for enabling a processor to send the identified one or more postings to the user comprises:
  code for enabling a processor to use the antenna descriptors of the transient user accounts to find and send postings to a mobile transient user based on global positioning system (GPS) coordinate data from a mobile communications device of the mobile transient user.

46. The computer program product of claim 35, further comprising:
  code for enabling a processor to maintain a record for a particular user of which the postings having geographical regions that contain the geographical location of the particular user, wherein the record does not maintain duplicates of the postings having geographical regions that contain the geographical location of the particular user.

47. The computer program product of claim 35, further comprising:
  code for enabling a processor to require a password associated with a posting to be used by any user requesting to view the information body of the posting.

48. The computer program product of claim 35, wherein said each posting includes an optional activation time period, the activation time period including a start time and a stop time, further comprising:
  code for enabling a processor to govern the duration of an availability a respective posting to users using the start time and the stop time.

49. The computer program product of claim 35, further comprising:
  code for enabling a processor to record user transaction data, the user transaction data including information related to a duration of contact with a respective user, and a record of actions performed within the duration by the respective user.

50. The computer program product of claim 36, further comprising:
  code for enabling a processor to stored the postings having geographical regions that contain the geographical location of a particular user in a user account of the particular user; and
  code for enabling a processor to permit the particular user to define criteria to determine when postings stored in a user account of the particular user are to generate email to the particular user.

51. The computer program product of claim 36, further comprising:
  code for enabling a processor to restrict the posting authority of any user account by accepting and storing a plurality of authorized region descriptors and unauthorized region descriptors, any authorized region descriptor optionally having at least one of an associated posting password and posting category restriction list; and
  code for enabling a processor to require at least one of the posting password and the category restriction list to be respected by any posting having geographical regions that contain the geographical location of a particular user in a user account of the particular user before storing the posting.

* * * * *